United States Patent [19]
Matsuyama et al.

[11] Patent Number: 5,913,016
[45] Date of Patent: *Jun. 15, 1999

[54] METHOD AND APPARATUS FOR CONTROLLING AN OUTPUT DEVICE BASED ON RECEIVED DATA

[75] Inventors: Shigeru Matsuyama, Yokohama; Kazuo Wakai, Funabashi; Keisuke Mitani, Yokohama; Yasushi Sato, Kawasaki, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/592,847

[22] Filed: Jan. 24, 1996

Related U.S. Application Data

[63] Continuation of application No. 08/181,787, Jan. 18, 1994, abandoned.

[30] Foreign Application Priority Data

Jan. 20, 1993 [JP] Japan ..................... 5-007923

[51] Int. Cl.⁶ ........................................ G06F 15/62
[52] U.S. Cl. ..................... 395/112; 395/500; 395/733
[58] Field of Search ............................ 395/800, 500, 395/114, 112, 113, 182.03, 834, 800.01, 733; 364/DIG. 1, DIG. 2

[56] References Cited

U.S. PATENT DOCUMENTS

| | | |
|---|---|---|
| 4,965,771 | 10/1990 | Morikawa et al. . |
| 4,992,957 | 2/1991 | Aoyama et al. ................ 364/519 |
| 5,075,874 | 12/1991 | Steeves et al. ................ 395/112 |
| 5,165,014 | 11/1992 | Vassar ............................ 395/112 |
| 5,222,200 | 6/1993 | Callister et al. . |
| 5,228,118 | 7/1993 | Sasaki ............................ 395/112 |
| 5,268,993 | 12/1993 | Ikenoue et al. ................ 395/114 |
| 5,293,466 | 3/1994 | Bringmann .................... 395/114 |
| 5,303,336 | 4/1994 | Kageyama et al. ............ 395/114 |
| 5,392,419 | 2/1995 | Walton ........................... 395/500 |
| 5,432,935 | 7/1995 | Kato et al. ..................... 395/682 |
| 5,511,149 | 4/1996 | Hayano .......................... 395/112 |
| 5,555,435 | 9/1996 | Campbell et al. ............. 395/800 |
| 5,561,744 | 10/1996 | Sugaya et al. ................. 395/112 |
| 5,604,843 | 2/1997 | Shaw et al. .................... 395/101 |

FOREIGN PATENT DOCUMENTS

| | | |
|---|---|---|
| 0096407 | 12/1983 | European Pat. Off. . |
| 0332779 | 9/1989 | European Pat. Off. . |
| 0469974 | 2/1992 | European Pat. Off. . |
| 0551206 | 7/1993 | European Pat. Off. . |
| 5-104828 | 4/1993 | Japan . |
| 5-96824 | 4/1993 | Japan . |
| 6-64249 | 3/1994 | Japan . |
| 2252187 | 7/1992 | United Kingdom . |
| WO90012359 | 10/1990 | WIPO . |

*Primary Examiner*—Meing-Ai T. An
*Assistant Examiner*—Walter D. Davis, Jr.
*Attorney, Agent, or Firm*—Fitzpatrick, Cella, Harper & Scinto

[57] ABSTRACT

An output control apparatus is interposed between a host computer for generating data and a printer, and controls the printer. The control apparatus includes a plurality of data generators, a discriminator, a controller and a notifying device. The data generators interpret a plurality of printer languages and perform control processing. The discriminator analyzes received data and specifies by which of the plurality of data generators control based upon the received data is to be carried out. The controller, in a case where one data generator is not specified by the discriminator and an error resulting from interpretation failure occurs during the course of processing by one data generator selected under prescribed conditions, causes the discriminator to re-execute processing based upon data in which the interpretation failure occurred. The notifying device notifies of a request for re-transmission of data in a case where one of the data generators is specified anew by the controller.

16 Claims, 20 Drawing Sheets

FIG. 3

| PROCEDURE | 1 | 2 | 3 | 4 | 5 | 6 | 7 | 8 | 9 | 10 | 11 | 12 | 13 |
|---|---|---|---|---|---|---|---|---|---|---|---|---|---|
| SELECTED EM | INITIAL STATE | 2 | 1 | 1 | 1 | ? | 1 | 2 | 1 | 2 | ? | 2 | ? |
| EC1 | 0 | 0 | 1 | 2 | 3 | 3 | 4 | 4 | 5 | 2.5 | 2.5 | 2.5 | 2.5 |
| EC2 | 0 | 1 | 1 | 1 | 1 | 1 | 1 | 2 | 2 | 2 | 2 | 3 | 3 |
| WC | 0 | 1 | 2 | 3 | 4 | 4 | 5 | 6 | 7 | 0 | 0 | 1 | 1 | ns/span>
METHOD AND APPARATUS FOR CONTROLLING AN OUTPUT DEVICE BASED ON RECEIVED DATA This application is a continuation of application Ser. No. 08/181,787 filed Jan. 18, 1994, now abandoned.

BACKGROUND OF THE INVENTION

This invention relates to an output control method and apparatus and, more particularly, to an output control method and apparatus for generating and outputting data for an apparatus on the basis of entered data.

A printer used in a computer system is adapted to receive and print data such as character codes and control codes from the host computer to which the printer is connected. The printer interprets the data format (which may be referred to as the printer language) sent from the host computer and records an image that is based on the data format or printer language on recording paper. In other words, it is required that the printer interpret fully the data sent from the host computer.

A variety of printer languages exist, as is well known. This means that the printer capable of being applied to a certain system is limited as a matter of course.

Accordingly, an emulation device (hereinafter referred to as an "EM device") has recently been developed for the purpose of designating a desired printer language by means of a switch and effecting a conversion into data suited to the printer.

In a case where a printer is connected directly to a single host computer, the above-mentioned EM device need only be interposed between the printer and the host computer. However, in a case where host computers of a plurality of types are connected simultaneously via a printer-mode changeover device internally incorporating a LAN (local area network) or a plurality of EM devices, the mode of the EM device must be changed whenever the type of host computer requesting printing is changed. This is a troublesome operation.

Further, an arrangement has been considered in which it is determined automatically, by table retrieval or weighted evaluation, the particular host computer (the printer language) from which data has been sent to the printer, and then generating the data that is suited to the printer.

However, if the data sent to the printer is data common to all host computers that are the object of conversion, the emulation mode to be executed cannot be specified.

SUMMARY OF THE INVENTION

Accordingly, an object of the present invention is to provide an output control method and apparatus in which, even if one process or means that is to execute control processing cannot be specified from received data, this can be analogized from the prevailing processing environment.

According to the present invention, the foregoing object is attained by providing a method of controlling an output control apparatus, which is interposed between a data generating source and an output unit, for controlling the output unit, comprising a plurality of data generating steps of generating data for the output unit upon interpreting a plurality of printer languages, a discriminating step of analyzing received data and specifying in which of the plurality of data generating steps control based upon the data is carried out, a step in which, when one data generating step has been specified by the discriminating step, is for increasing the number of times the specified data generating step is started, and a step in which, when one data generating step based upon received data cannot be specified in the discriminating step, is for selecting one data generating step based upon the number of times each data generating step started in the past.

Further, according to the present invention, the foregoing object is attained by providing an output control apparatus, which is interposed between a data generating source and an output unit, for controlling the output unit, comprising a plurality of data generating means for interpreting a plurality of printer languages and performing output control processing, discriminating means for analyzing received data and specifying by which of the plurality of data generating means control based upon the data is carried out, means which, when one data generating means has been specified by the discriminating means, is for increasing the number of times the specified data generating means is started, and means which, when one data generating means based upon received data cannot be specified by the discriminating means, is for selecting one data generating means based upon the number of times each data generating means has been started in the past.

In accordance with the invention described above, the arrangement is such that if one data generating means to be started cannot be specified solely by received data, one data generating means is selected based upon the number of times each data generating means started in the past.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a diagram illustrating the transitions of a counters for the purpose of describing the operation of the printing control apparatus of the first embodiment;

DESCRIPTION OF THE PREFERRED EMBODIMENTS

Preferred embodiments of the present invention will now be described in detail with reference to the accompanying drawings.

Figure 1:
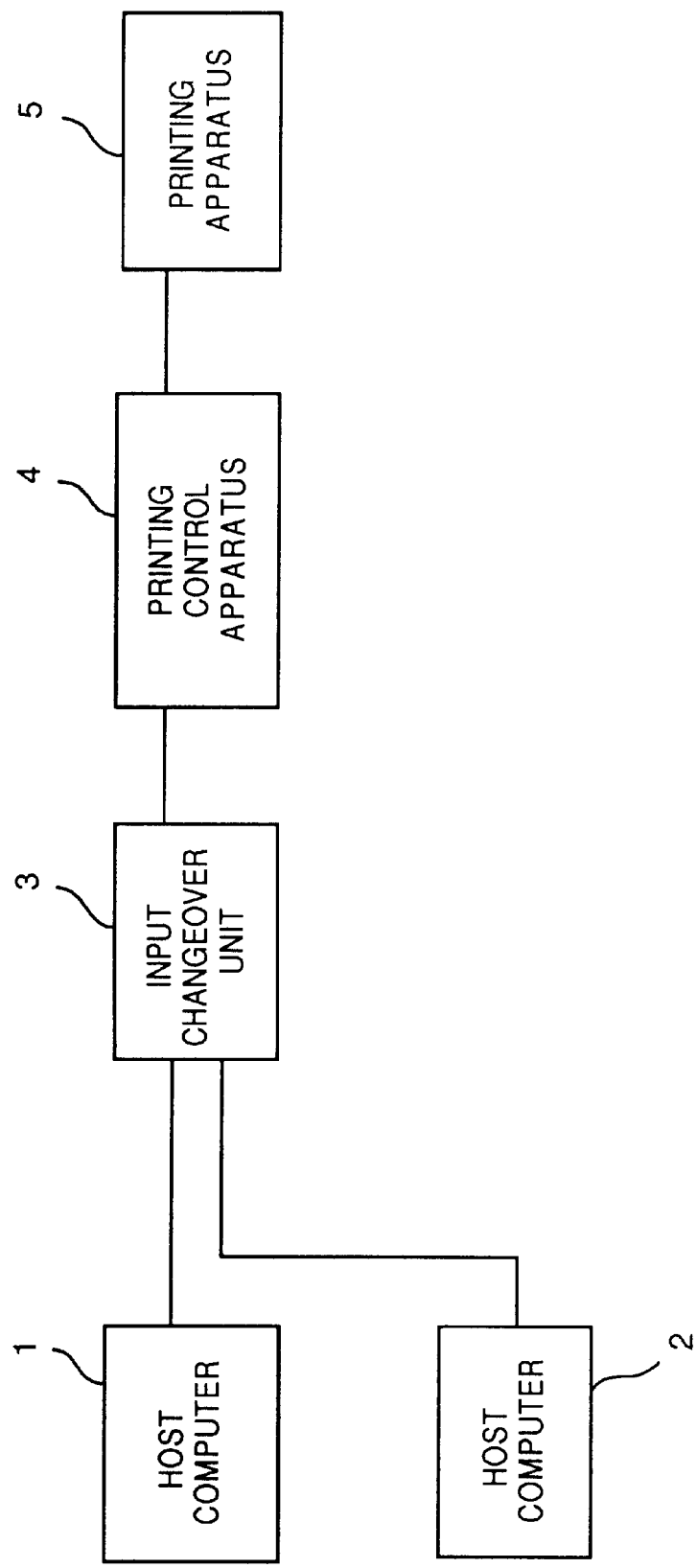
FIG. 1 is a block diagram illustrating a system according to a first embodiment of the present invention.

FIG. 1 is a block diagram illustrating the configuration of a host computer system according to a first embodiment of the invention.

The system according to this embodiment includes host computers 1, 2 that transmit printing data, an input changeover unit 3 having two input ports and one output port, a printing control apparatus 4 and a printing apparatus 5.

In the system configuration described above, the host computer 1 or 2 sends the input changeover unit 3 printing data such as character or control codes that are in accordance with a printer language having a format dependent upon the application program, or OS, running in each host computer. The input changeover unit 3 renders effective only the input port at which input has been detected and transfers this input data to the printing control apparatus 4. The latter converts the printing data, which has been sent via the input changeover unit 3, into printing data (language data or image data of the native mode possessed by the printing apparatus) having the format suited to the printing apparatus 5 and then sends this printing data to the printing apparatus 5. The printing apparatus 5 records an image based upon the printing data sent to it.

Upon passage of a prescribed period of time from the moment power is introduced or from the moment printing data stops being received from any host computer, the input changeover unit 3 outputs a signal READY, which indicates that reception is possible, to both host computers.

Figure 2:
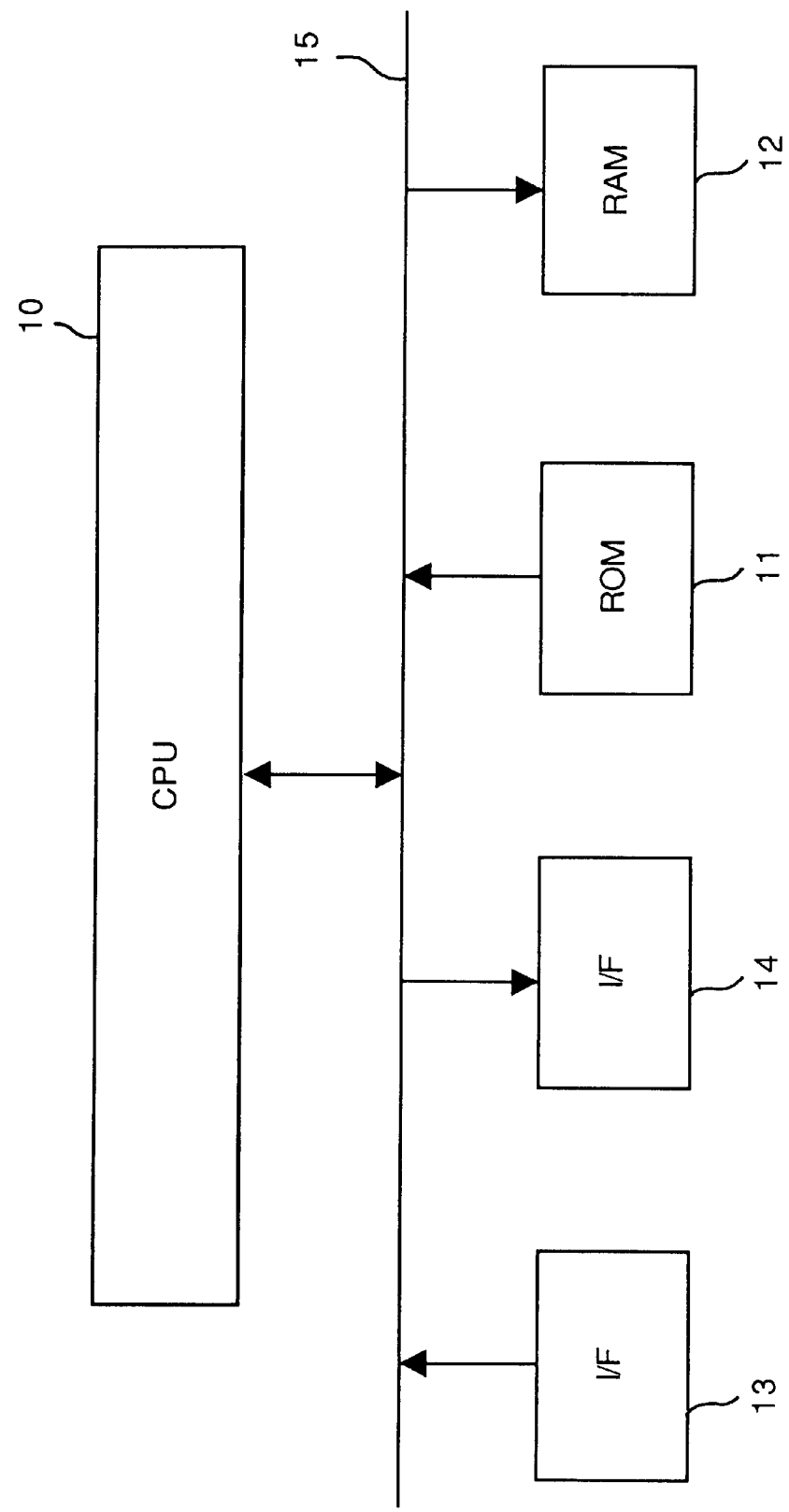
FIG. 2 is a block diagram illustrating a printing control apparatus according to the first embodiment.

The construction of the printing control apparatus 4 according to this embodiment is illustrated in FIG. 2.

The apparatus 4 includes a central processing unit (CPU) 10 for supervising overall control of the printing control apparatus 4. The CPU 10 has a clock-pulse generating circuit, a delay circuit, a gate circuit and other logic circuitry, by way of example.

A read-only memory (ROM) 11 stores the content of processing executed by the CPU 10 as well as a procedure for executing a series of control processing operations such as control processing for supplying control signals to various components. A stored procedure is a program corresponding to the flowchart of FIG. 4, by way of example. It goes without saying that a program for interpreting various printer languages and converting a printer language into data suited to the printing apparatus also is stored in the ROM 11.

A random-access memory (RAM) 12 is utilized as a work area of the CPU 10 (namely as a reception buffer, output buffer and area for storing various operating states of the apparatus). The RAM 12 also has a storage area for storing the number of times each EM device is started.

An input interface (I/F) 13 is for accepting data sent from the input changeover unit 3, and an output interface (I/F) 14 is for transferring the printing data, which has been converted within the printing control apparatus, to the printing apparatus 5.

Each component described above is connected to a bus line 15 and is capable of being controlled by the CPU 10.

The specific operation of this embodiment will now be described. For the sake of simplicity, it will be assumed that the printing control apparatus 4 in this embodiment has two emulation modes.

In a case where printing data sent from the host computers 1, 2 has been analyzed and various control commands contained in the printing data employ printer languages peculiar to a printer, which emulation should be started with regard to the sent printing data can be judged in a simple manner. The problem is when an application running in a host computer does not perform complicated processing, in which case a command peculiar to a printer language is not generated. When data having such a format is sent to the printing control apparatus, it is impossible to specify to which emulation the changeover should be made.

Accordingly, in this embodiment of the invention, the transition of start of emulations in the past is investigated and processing for converting the printing data is performed giving priority to the higher frequency of occurrence. However, since the system is operating in the currently prevailing environment, it is meaningless to investigate frequency going back too far in the past. In this embodiment, therefore, processing for receiving printing data and transferring converted data to the printing apparatus is counted as one job, and n-number of past jobs is adopted as the effective range. Further, since the frequency of selection of emulations further back is not necessarily negligible, multiplication by a predetermined coefficient is performed.

Processing will now be described in accordance with FIG. 3 and the flowchart of FIG. 4. In FIG. 3, EC1, EC2 represent counters for counting the number of operations of emulation modes 1, 2, and WC denotes a counter for counting the number of times the emulations 1 and 2 are formally recognized. These counters make use of prescribed areas in the RAM 12. Further, each counter is set to "0" as an initial value, and it is assumed that the emulation mode in the initial state is selected to be the emulation mode 1 (this means that the emulation mode 1 has a higher order of priority than the emulation mode 2).

Further, when printing data is sent to the I/F 13 from the input changeover unit 3, the CPU 10 is interrupted. In the interrupt processing, the CPU 10 accepts the printing data from the I/F 13. This need not be described. The same will hold in the other embodiments set forth below.

Processing will now be described in accordance with the flowchart of FIG. 4. It will be assumed that the jobs of the host computer 1 or 2 have been sent in the order indicated by the item "Procedure" in FIG. 3.

In the first embodiment, as well as in the other embodiments described later, identification of the end of one item of printing data is assumed to be when printing data no longer arrives even upon passage of a prescribed period of time. However, this does not impose a limitation upon the invention. That is, in a case where the host computer attaches a control code, which indicates the end of a job, to the end of printing data, this control code need only be recognized.

Figure 4:
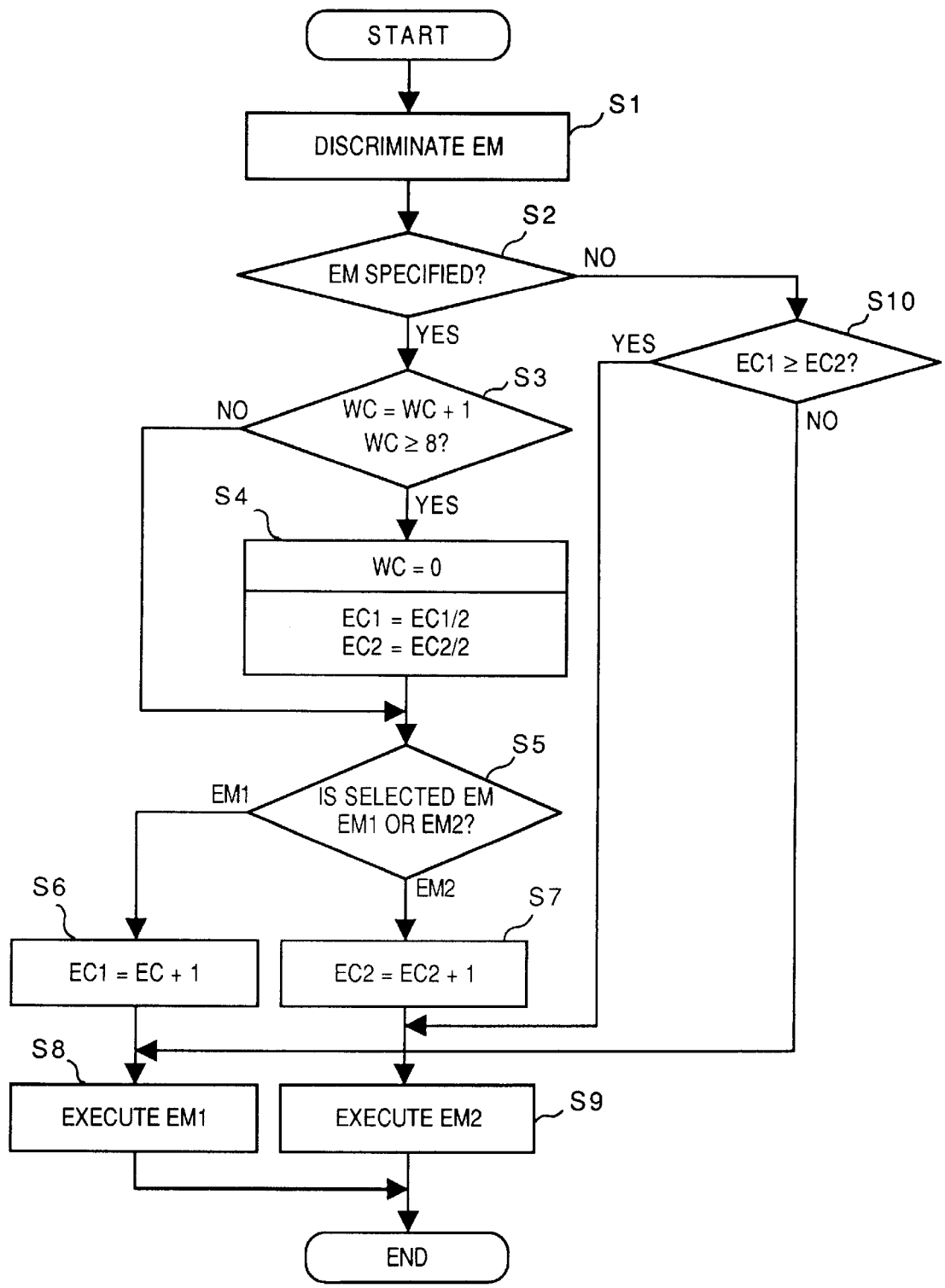
FIG. 4 is a flowchart illustrating the details of operation according to the first embodiment.

When printing data has been sent from the input changeover unit 3, step S1 of the flowchart of FIG. 4 is executed. This involves analyzing the received printing data to determine in which emulation mode the data has been received, and judging whether printing data for the printing apparatus 5 is to be generated or not. This judgment is made by comparing the received data with the control command peculiar to each printer language already registered in the ROM 11.

Next, when the program proceeds to step S2, it is judged whether an emulation mode to be selected could be specified. If a control command peculiar to any printer language is present in the received printing data, then the program proceeds to step S3. If it is determined at step S2 that only a control command common to all printer languages is present and, hence, the corresponding emulation mode cannot be specified, the program proceeds to step S10.

It is assumed that the procedures of FIG. 3 hold. Therefore, if the first job (procedure 2) is such that data processed in the emulation mode 2 has been sent, or in other words, if the data can be specified as being data for the emulation mode 2, then the program proceeds from step S2 to step S3.

When the program proceeds to step S3, this means that the emulation mode in which processing is to be performed has been specified. The counter WC, therefore, is incremented. As a result, the value of the counter WC becomes "1". Since this is less than "8", step S4 is skipped and the program proceeds to step S5.

Which emulation mode has been specified is determined at step S5. Here, since the emulation mode 2 has been selected, the program proceeds to step S7, where the counter EC2 is incremented, and then to step S9, at which processing is started in the emulation mode 2.

In the following procedures 3 5, it is indicated that the printing data for the emulation mode 1 will be sent. As a result, steps S6 and S8 are executed. It should be noted that the processing for outputting the printing data to printing apparatus is executed at step S8 and S9.

At this time, in accordance with the above-described procedures, the counter WC is incremented by "3" in procedures 3~5, as a result of which the count in counter WC becomes "4" and the count in counter EC1 becomes "3". The emulation mode 1 is executed in each of these procedures.

The next procedure 6 represents a case in which it cannot be specified in which emulation mode the printing data received via the input changeover unit 3 should be processed. Accordingly, the program proceeds from step S2 to step S10.

The counts in the counters EC1 and EC2 are compared at this time at step S10 to determine which counter is larger. In accordance with this embodiment, the value in counter EC1 is "3" and the value in counter EC2 is "1" at this time, and therefore the program proceeds to step S8, at which processing is executed in the emulation mode 1.

In any case, if the emulation mode cannot be specified from the received printing data, the value in each counter is not updated. The reason for this is that if the counter EC1, for example, were incremented in a case where the specification could not be made, the processing of the emulation mode 1 would have an influence upon the subsequent discrimination processing. In other words, in this embodiment, the counters EC1, EC2 in a case where the specification has been made are exploited as significant information.

In the procedures 7~9 of FIG. 3, the above-described processing is executed. As a result (at the moment the job of procedure 9 ends), the counts in counters EC1, EC2 and WC are updated to "5", "2" and "7", respectively.

Procedure 10 is a case in which printing data is received and it has been specified that this is data to be printed in the emulation mode 2. The program therefore proceeds to step S3. Here the value of counter WC is incremented by "1", as a result of which the held value becomes "8". Accordingly, the decision rendered at step S3 is "YES" and the program proceeds to step S4.

The processing of step S4 is so-called initialization processing. That is, if the value in counter WC has become "8", a new job starts to be counted and the value in counter WC is reset to "0". If the counters EC1, EC2 were reset to "0", the criteria for judgment in a case where the emulation mode for the printing data of the immediately following job cannot be specified would vanish. Therefore, the preceding counted value is halved to leave some influence.

As a result, the counts in counters EC1 and EC2 become "2.5" and "1", respectively. Since it has been judged that the job of interest is data to be processed in emulation mode 2, the program proceeds to step S7 and the count in counter EC2 is updated to "2". Thereafter, processing is executed in emulation mode 2 at step S9.

Procedure 11 indicates a case in which the emulation mode to be started cannot be specified solely by the printing data. Accordingly, at step S10, the counts in counters EC1, EC2 are "2.5" and "2", respectively, and therefore the program proceeds to step S8, at which processing of the emulation mode 1 is executed.

The next procedure 12 is for a case in which printing data for the emulation mode 2 is received, and therefore the counter EC2 is updated to "3".

As a result, in a case where printing data is received in which it is impossible to specify in which emulation mode processing is to be performed, as indicated at procedure 13, the program proceeds to step S10. In the current case, EC1<EC2 ($\therefore$EC1=2.5, EC2=3) holds and therefore the emulation mode 2 is selected and executed.

It should be noted that when EC1>EC2 holds in the decision of step S10, the counter EC1 is assigned an order of priority higher than that of counter EC2. In a case where the same value is held, it is so arranged that the emulation mode 1 is selected.

Thus, in a case where emulation cannot be selected, as in procedure 6 in FIG. 3, the number of times emulation 1 was selected in the past is three, the number of times emulation 2 was selected is one and the emulation counters also store 3 and 1, respectively. Therefore, emulation 1 is selected. In the case of procedure 13, the total number of times emulation 1 was selected in the past is five and the total time of times emulation 2 was selected is four. However, since 2.5 and 3 have been stored in the emulation selection counters, in this case the emulation EM2 is selected. The reason for this is as follows: This is processing when emulation 2 in procedure 10 has been selected. As a result of counting up the work counter, eight is attained, the work counter WC is cleared and the value of EC2 is incremented by +1 after the values in the emulation selection counters EC1 and EC2 are halved.

More specifically, even if the value of counter EC1 is "5" larger than the value of counter EC2 at a certain time, the difference between the values counters EC1 and EC2 is halved to 2.5 when the work counter WC (the number of times printing jobs have been performed) exceeds eight. In other words, the influence of past jobs is diminished. It should be noted that although the values in the counters EC1, EC2 are multiplied by ½ in a case where the value in work counter WC becomes "8", multiplication may be performed by ⅓, ⅔, etc. Further, it is unnecessary for the counters EC1, EC2 to hold the results of calculation correctly; it will suffice if the value is accurate at least to the first decimal place.

In accordance with this embodiment as described above, a special technique is used to count the number of times each emulation is selected. By virtue of this technique, a value representing the time-dependent number of selections of each emulation is stored in each emulation selection counter, and it is possible to assign dynamically an order of priority of a high rate of selection conformity.

Further, in this embodiment, two examples are mentioned as the types of emulation. However, by providing three or more counters, a number of emulation modes can be dealt with, as would readily occur to one skilled in the art. In addition, when the counter WC attains a value of "8", it may be set to the optimum value rather than being reset. Alternatively, it is obvious that a switch may be provided so that any value can be set at will. The same is true with regard to the value (½ in the example described above) by which the values in counters EC1, EC2 are multiplied.

Second Embodiment

Figure 5:
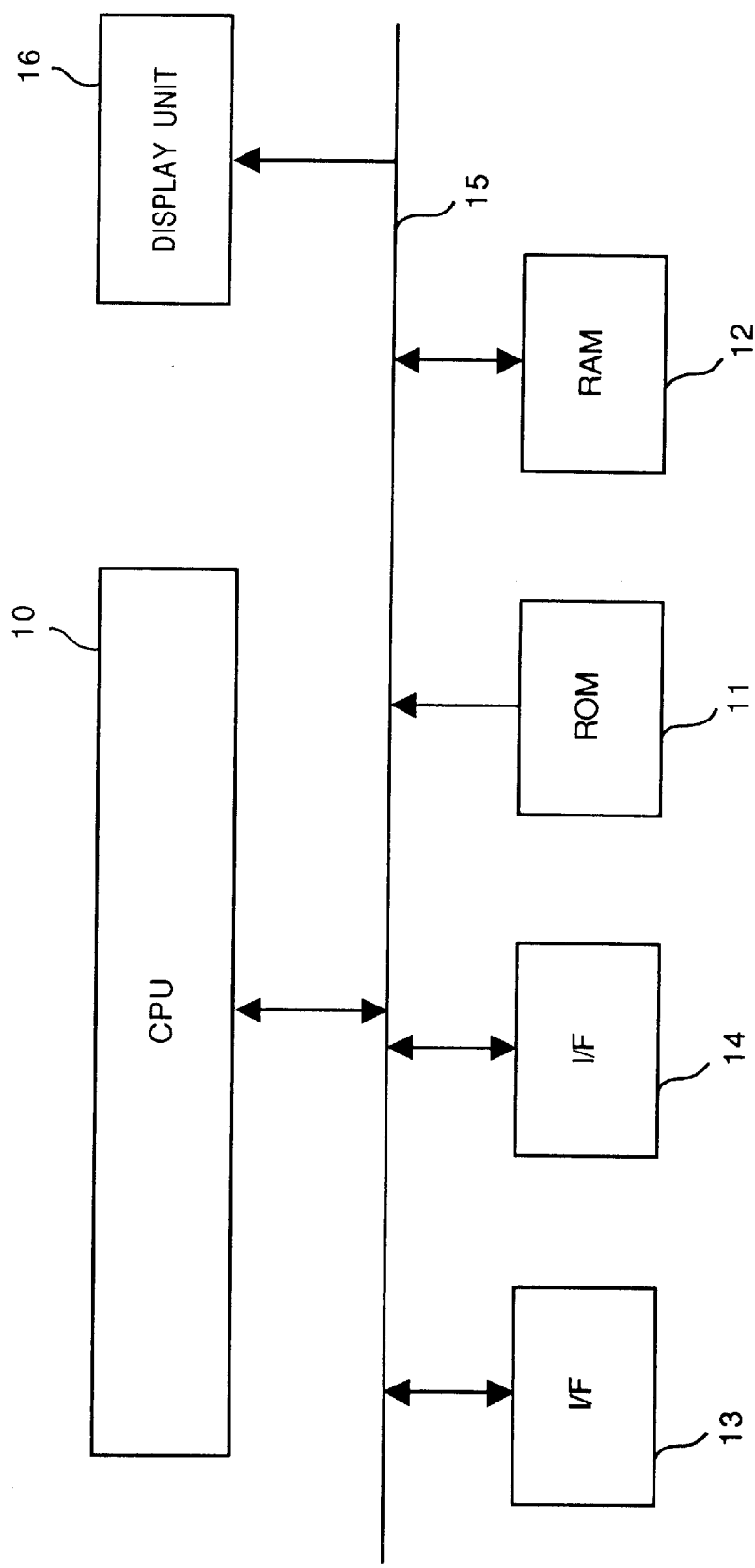
FIG. 5 is a block diagram illustrating a printing control apparatus according to a second embodiment of the present invention.

FIG. 5 is a block diagram illustrating a printing control apparatus according to a second embodiment. Elements identical with those in the printing control apparatus of the first embodiment described above are designated by like reference numerals. This embodiment differs from the first embodiment in that a display unit 16 is provided. The system configuration is that shown in FIG. 1.

Figure 6:
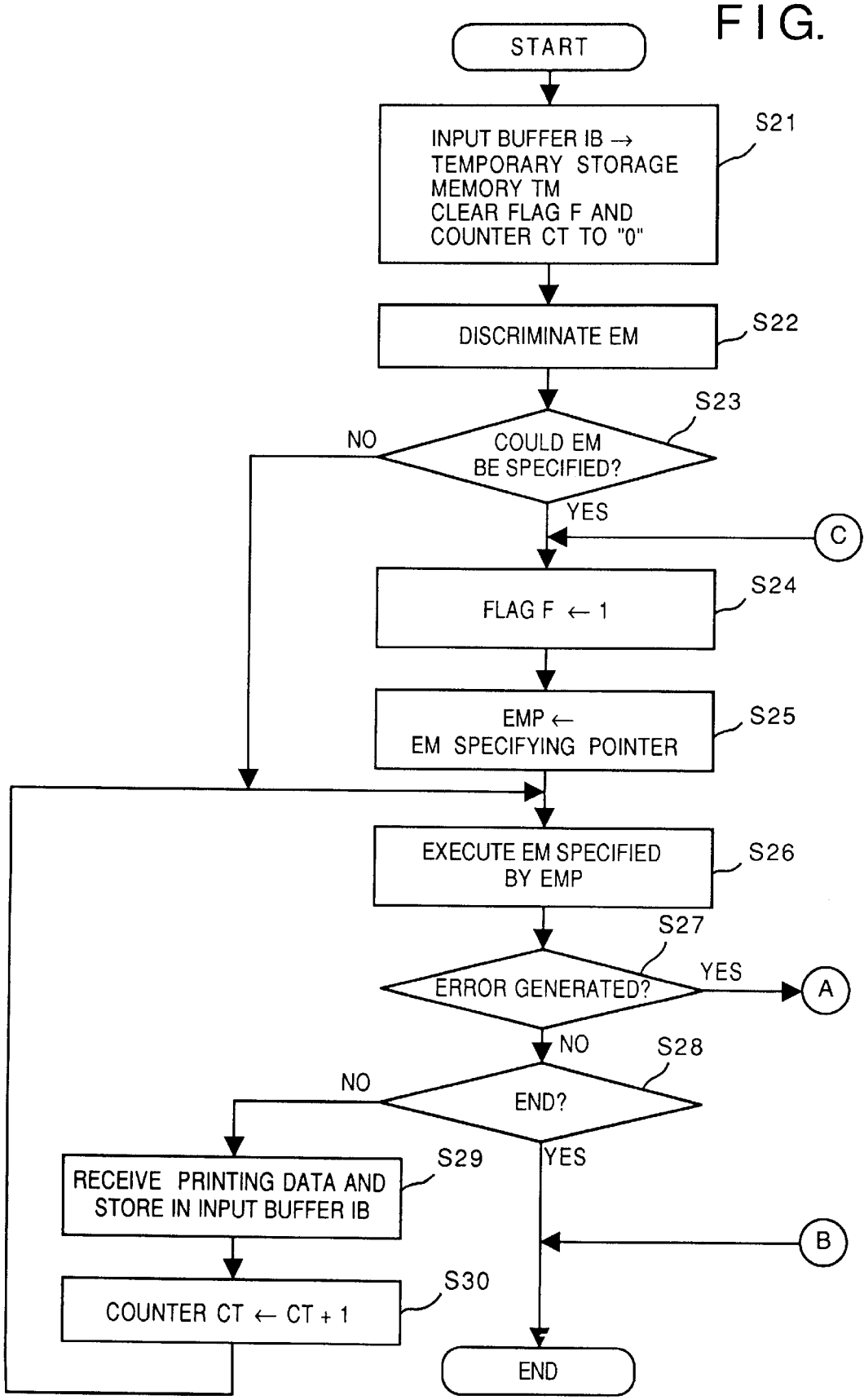
FIG. 6 is a flowchart illustrating the details of operation according to the second embodiment.
Figure 7:
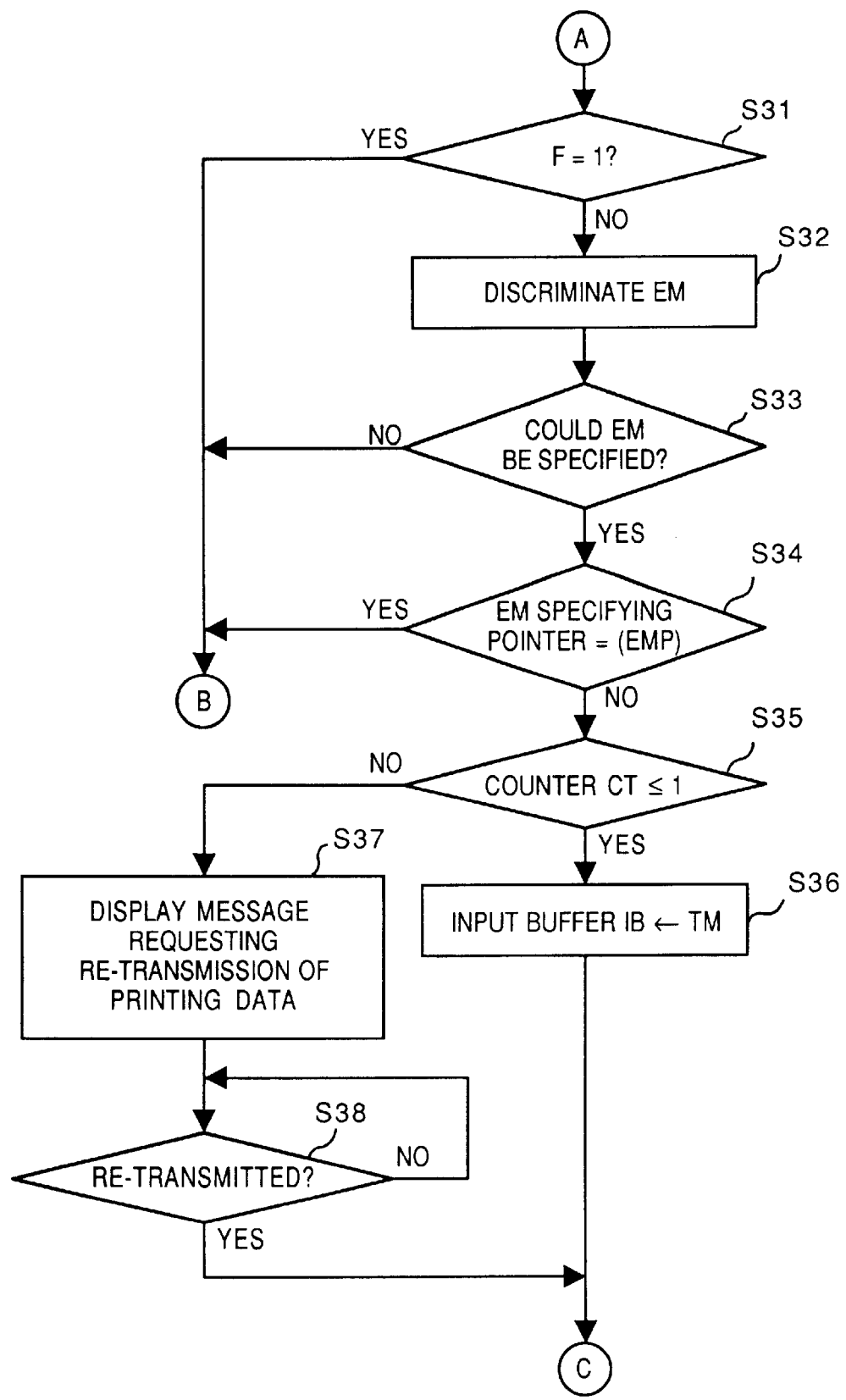
FIG. 7 is a flowchart illustrating the details of operation according to the second embodiment.

The operation of the second embodiment (the processing executed by the CPU 10) will be described in accordance with the flowchart of FIG. 6. The processing procedure (program) naturally is stored in the ROM 11. The same is true with regard to the embodiments described later. An input buffer IB, flag F, pointer EMP, counter CT and temporary storage memory TM described below are contained in the RAM 12. The input buffer IB is an area that temporarily stores the received data from the input changeover unit 3, and the flag F stores information indicating whether, on the basis of entered data, the corresponding emulation mode was capable of being specified or not. The pointer EMP stores the head address of a program of the emulation mode executed by the immediately preceding job. The counter CT stores the number (e.g., the number of pages) of items of printing data of a prescribed amount. In the initial state, the emulation mode 1 is selected, and the entry address of this program is set in the pointer EMP. The operation of the second embodiment will now be described.

When the input buffer IB receives printing data via the input changeover unit 3, the data in the input buffer IB is copied to the temporary storage memory TM and both the flag F and counter CT are cleared to "0" at step S21.

Next, at step S22, it is determined, based upon the received printing data that has been stored in the input buffer IB, in which emulation mode processing is executed. In a case where the corresponding emulation mode has been specified, the program proceeds to step S24, where the flag F is set to "1", and then to step S25, at which the address of the corresponding emulation mode is set in the pointer EMP.

Accordingly, in a case where the emulation mode could not be specified, the flag F remains at "0" and EMP is set to the initial state or the mode corresponding to the previous job.

When the program proceeds to step S26, image conversion processing is executed based upon the emulation mode indicated by the pointer EMP. Next, it is determined at step S27 whether a syntax error or the like has occurred in the received control command. If such an error has occurred, the program proceeds to step S31. If no error has occurred, the results of conversion are outputted to the printing apparatus and the program proceeds to step S28.

Processing in the absence of an error will now be described.

When the program proceeds to step S28, it is determined whether printing processing of a job has ended or not. If the decision rendered is that processing has not ended, then the program proceeds to step S29, at which reception of the next item of printing data is performed and the data is stored in the reception buffer IB. The program then proceeds to step S30, at which the counter CT is incremented. This is followed by execution of the processing of step S26. If it is determined that the processing for one job has ended ("YES" at step S28), processing is terminated.

It should be noted that the emulation processing described above is performed in the units of the data stored in the input buffer IB.

If a syntax error occurs during execution of emulation processing and the program proceeds to step S31 as a result, it is determined at this time whether the flag F is "1" or not. Since Flag F=1 means that a genuine error has occurred, processing is terminated and a buzzer or the like (not shown) is sounded. The reason for this is that emulation currently being executed is operating in the emulation mode intended for the host computer and an error has occurred in spite of this.

If it is determined that the flag F is not "1", there is a possibility that the emulation mode currently being executed is erroneous. The program therefore proceeds to step S32, at which processing for discriminating the emulation mode is executed in the same manner as at step S22.

Next, it is determined at step S33 whether the corresponding emulation mode could be specified. If the mode could not be specified, then processing is terminated. If the emulation mode could be specified, then the program proceeds to step S34, where the emulation mode that could specified is compared with the emulation (indicated by EMP) executed thus far. If the two are identical, then the error that has occurred is a genuine error and processing is terminated as a result.

In a case where a newly discriminated emulation mode differs from the emulation mode executed thus far, the program proceeds to step S35.

The counter CT is investigated at step S35, where it is determined whether the value in the counter is equal to or less than "1", i.e., "0", "1" or greater.

In a case where the value in counter CT is "0" or "1", this means that the block of printing data initially received is still left in the temporary storage memory TM and will suffice if processing is executed in the newly specified emulation mode. Accordingly, in this case, the data in the temporary storage memory TM is copied to the input buffer IB and the program returns to step S24.

If the value in counter CT is greater than "1", then the program proceeds to step S37, where a message prompting re-transmission of the printing data is displayed on the display unit 16. The system then waits for reception of the data at step S38. If the printing data has been re-transmitted, the program returns to step S24 and processing resumes.

In accordance with the second embodiment as described above, processing is executed in an emulation mode that is in accordance with a prescribed order of priority in a case where an emulation mode to be started could not be specified with regard to entered printing control data. If a syntax error in the control data has occurred, processing for determining the emulation mode is performed again at this time and printing control is carried out from the beginning. As a result, it is possible to obtain correct printing.

In the second embodiment, the input buffer may be of any size. For example, the capacity of the input buffer may be equivalent to one page.

Third Embodiment

Figure 8:
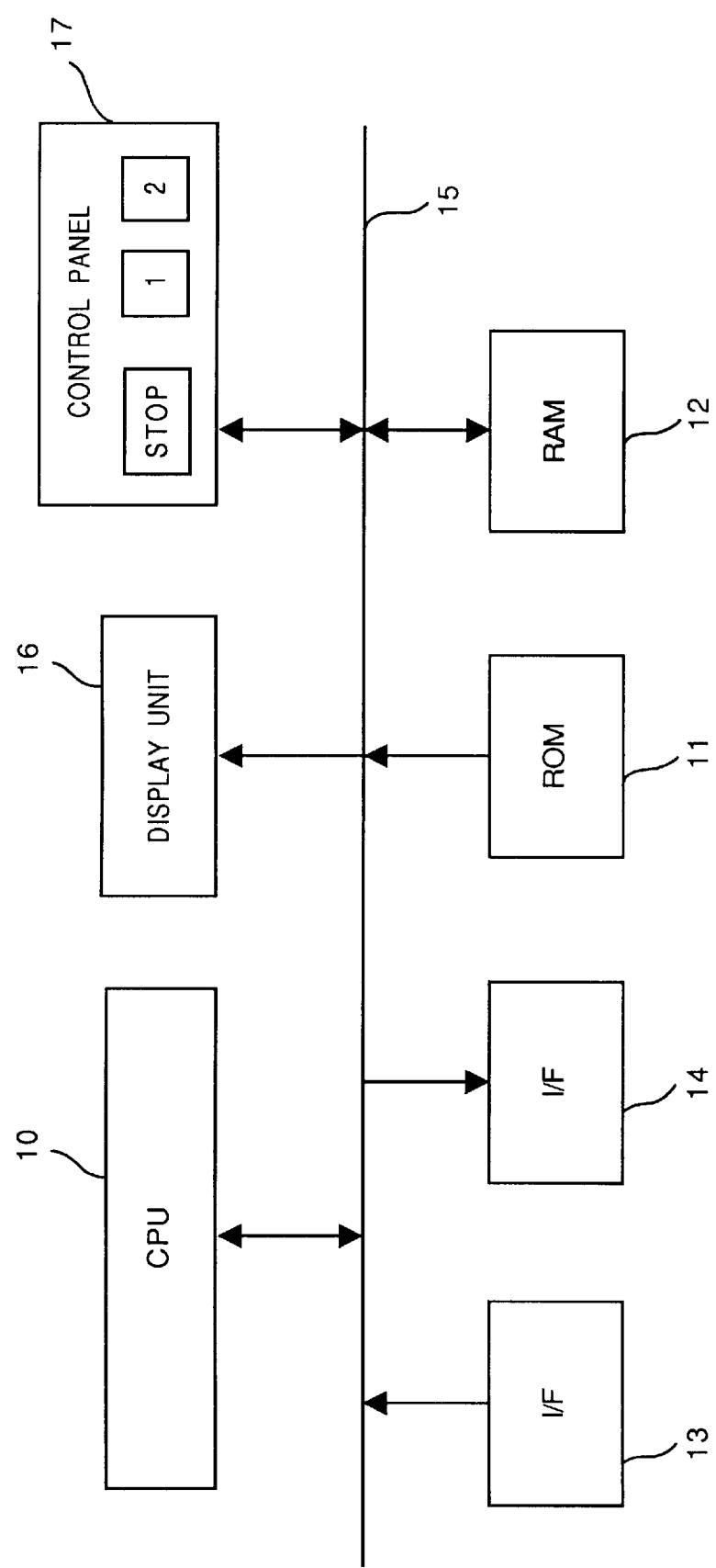
FIG. 8 is a block diagram illustrating a printing control apparatus according to a third embodiment of the present invention.
Figure 9:
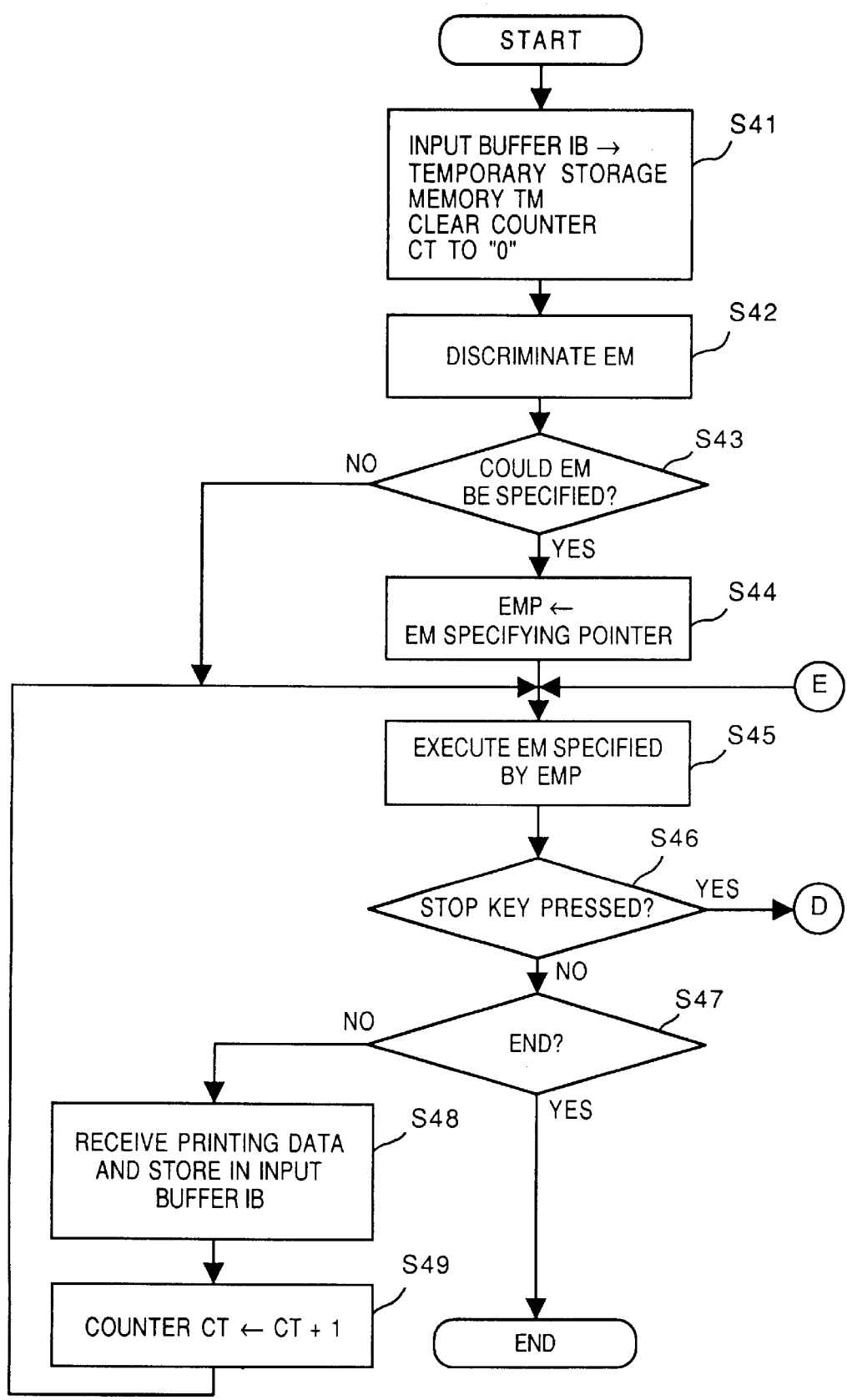
FIG. 9 is a flowchart illustrating the details of operation according to the third embodiment.
Figure 10:
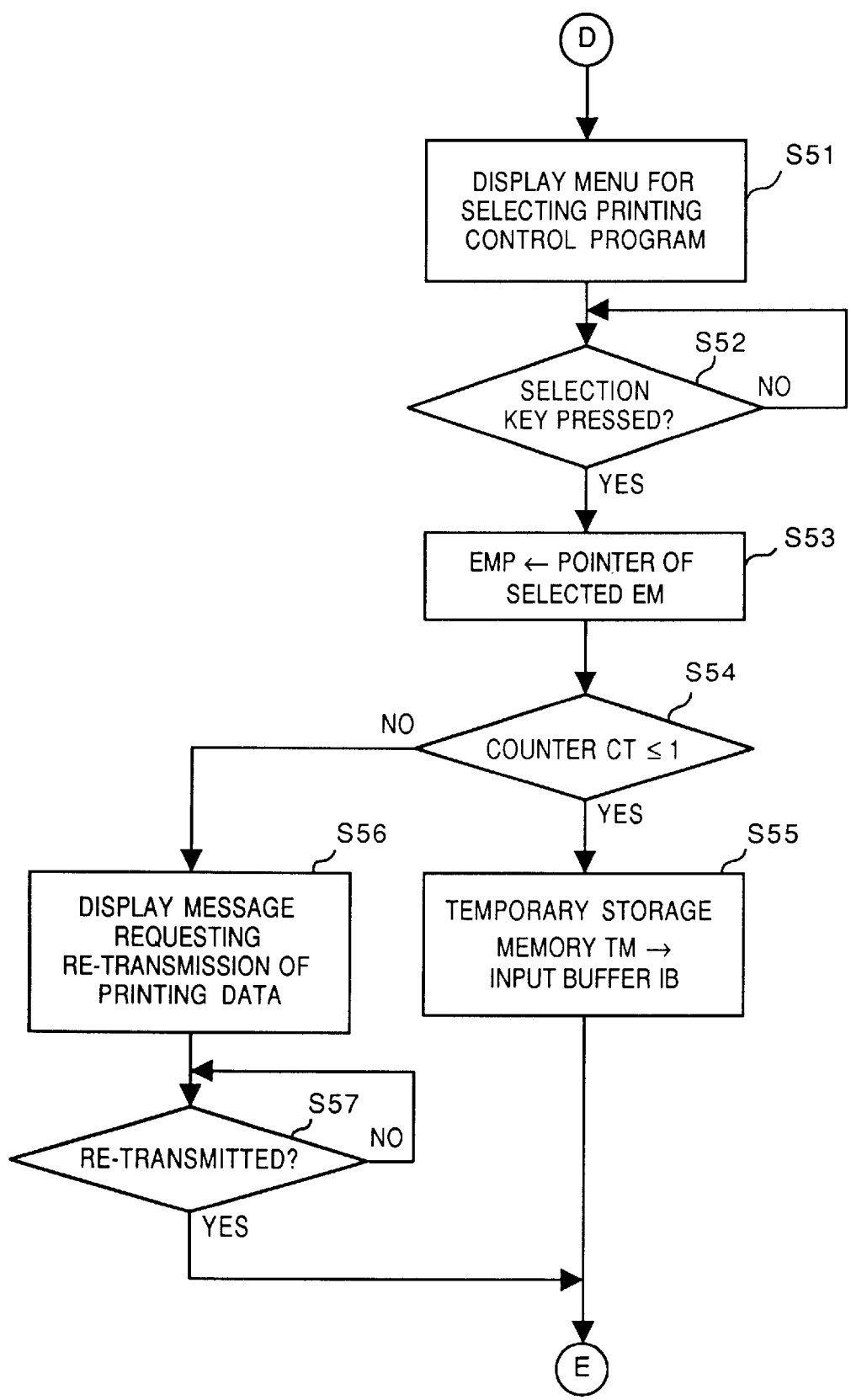
FIG. 10 is a flowchart illustrating the details of operation according to the third embodiment.

FIG. 8 is a block diagram of a printing control apparatus according to a third embodiment of the invention. Elements identical with those in the printing control apparatus of the first embodiment described above are designated by like reference numerals. The third embodiment differs from the second embodiment in that it is further provided with a control panel 17. The latter has a key "STOP" for stopping printing, a selection key "1" for selecting the emulation mode 1, and a selection key "2" for selecting the emulation mode 2.

The operation of the third embodiment will now be described.

When the input buffer IB receives printing data via the input changeover unit 3, the data in the input buffer IB is copied to the temporary storage memory TM and both the flag F and counter CT are cleared to "0" at step S41.

Next, at step S42, it is determined, based upon the received printing data that has been stored in the input buffer IB, in which emulation mode processing is executed. In a case where the corresponding emulation mode could be specified, the program proceeds to step S44. Here, in order to store the emulation mode that has been specified, the head address of this program is stored in the pointer EMP provided at the prescribed address in RAM 12. When power is introduced, the data indicating the emulation mode 1 is stored in the pointer EMP as an initial value. Therefore, if the emulation mode could not be specified, the mode will be the emulation mode 1 when power is introduced. In a case where printing processing has been performed a number of times, processing is executed in the immediately preceding emulation mode.

Next, at step S45, processing based upon the received data is executed in the emulation mode indicated by the pointer EMP. The program proceeds to step S47 if the "STOP" key is not pressed during execution of processing and to step S51 if the "STOP" key is pressed during processing.

When the program proceeds to step S47, it is determined whether printing processing of the series of jobs has ended or not. If the decision rendered is that processing has not ended, then the program proceeds to step S48, at which reception of the next item of printing data is performed and the data is stored in the reception buffer IB. The program then proceeds to step S49, at which the counter CT is incremented. The program then returns to step S45.

It should be noted that the emulation processing described above is performed in the units of the data stored in the input buffer IB.

If the "STOP" key is pressed during execution of emulation processing and the program proceeds to step S51, a selection menu for selection of printing control programs (emulation modes 1, 2) is displayed on the display unit 16, after which the system waits for pressing of key "1" or "2" on the control panel 17 at step S52. In other words, the operator is allowed to select the emulation mode.

When the program proceeds to step S53, the selected emulation mode is stored in the pointer EMP and the program proceeds to step S54.

The counter CT is investigated at step S54, where it is determined whether the value in the counter CT is equal to or less than "1", i.e., "0", "1" or greater.

In a case where the value in counter CT is "0" or "1", this means that the block of printing data initially received is still left in the temporary storage memory TM and will suffice if processing is executed in the newly specified emulation mode. Accordingly, in this case, the data in the temporary storage memory TM is copied to the input buffer IB and the program returns to step S45.

If the value in counter CT is greater than "1", then the program proceeds to step S56, where a message prompting re-transmission of the printing data is displayed on the display unit 16. The system then waits for reception of the data at step S57. If the printing data has been re-transmitted, the program returns to step S45 and processing resumes.

In accordance with the third embodiment as described above, processing is executed in an emulation mode that is in accordance with a prescribed order of priority in a case where an emulation mode to be started could not be specified with regard to entered printing control data. If the results are not as intended when the processing is executed, printing processing is suspended, the correct emulation mode is selected and printing control is carried out from the beginning. As a result, it is possible to obtain correct printing.

Fourth Embodiment

Figure 11:
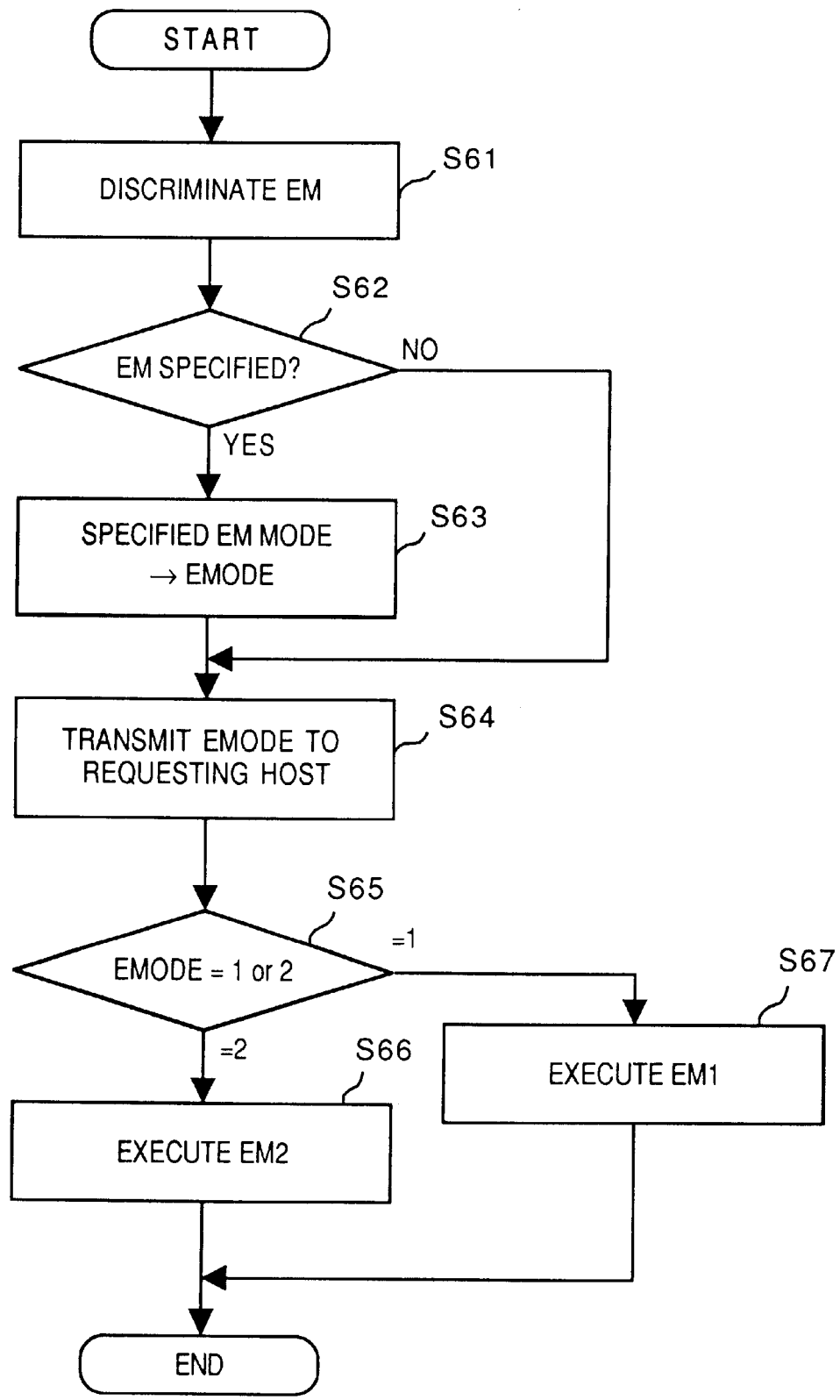
FIG. 11 is a flowchart illustrating the details of operation according to a fourth embodiment.

A fourth embodiment of the invention will now be described. The printing control apparatus 4 according to the fourth embodiment is the same as that of the second embodiment, and the operation thereof will be described in accordance with the flowchart of FIG. 11.

It will be assumed here that an interface between the host computer 1 and the input changeover unit 3 and an interface between the input changeover unit 3 and printing control apparatus 4 are capable of sending and receiving bidirectional data.

The data (or more correctly, the control code) in the reception buffer within the RAM 12 is investigated, the printer language of the printing data is determined and the corresponding emulation mode is specified at step S61. Then, if it is determined at step S62 that the specification processing has ended in failure, the processing of step S63 is skipped and the program proceeds to step S64. If the emulation is capable of being specified, then the program proceeds to step S63, where the emulation mode that has been specified is stored in EMODE secured in advance at a prescribed address location in the RAM 12. The emulation mode in which processing was performed previously (or the emulation mode of the initial state) will have been stored in EMODE in a case where specification of the emulation mode has ended in failure.

When the program proceeds to step S64, the data in EMODE at this time is sent back to the input changeover unit 3 via the interface I/F 13. The input changeover unit 3 then sends the received EMODE data back to the host computer 1 or 2, whichever has been selected.

As a result, the printing control apparatus 4 is capable of sending the data in EMODE back to the host computer that transmitted the received printing data.

When the program proceeds to step S65, the data in EMODE at this time is discriminated and it is determined whether the data is the emulation mode 1 or the emulation mode 2. In case of emulation mode 2, the program proceeds to step S66, at which processing is executed in this mode. In case of emulation, mode 1, the program proceeds to step S67, where printing control processing based upon this mode is executed.

As a result of the foregoing, in accordance with the fourth embodiment, processing is executed in an emulation mode that is in accordance with a prescribed order of priority in a case where an emulation mode to be started could not be specified with regard to entered printing control data. At such time the emulation mode to be processed is communicated, via the input changeover unit or a LAN, to the host computer that performed the transmission.

Accordingly, if it is so arranged that the host computer displays the communicated information, the operator may judge, based upon the printing instructed, whether the desired results have been obtained. If the desired results have not been obtained, the operator may suspend printing processing and re-process the output of the printed data.

Fifth Embodiment

The printing control apparatus in a fifth embodiment is the same as that of the fourth embodiment described earlier. Accordingly, only the operation of the fifth embodiment will be described.

Figure 12:
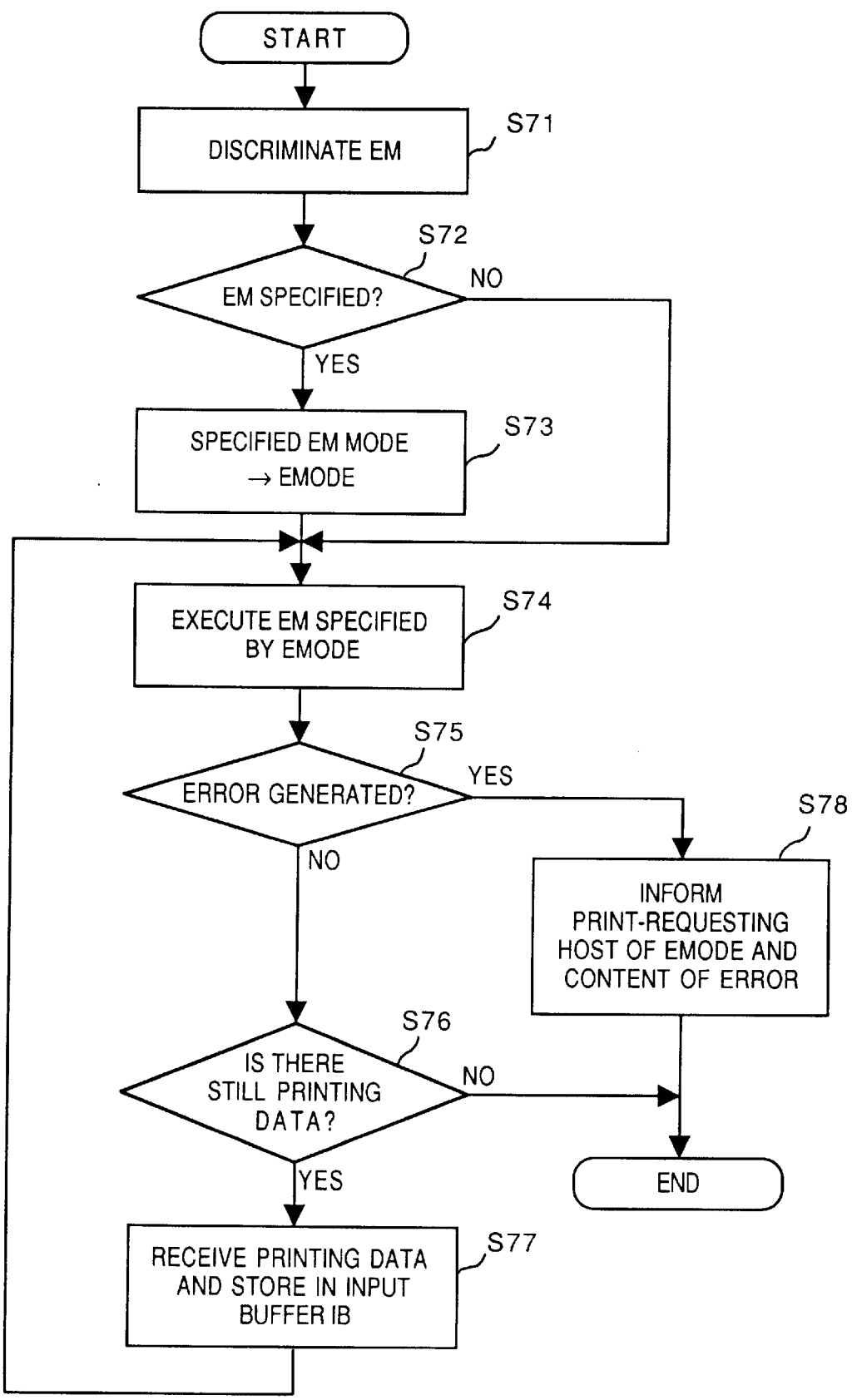
FIG. 12 is a flowchart illustrating the details of operation according to a fifth embodiment.

FIG. 12 is a flowchart illustrating the processing executed according to the fifth embodiment.

The data in the reception buffer within the RAM 12 is investigated, the printer language of the printing data is determined and the corresponding emulation mode is specified at step S71. Then, if it is determined at step S72 that the specification processing has ended in failure, the processing of step S73 is skipped and the program proceeds to step S74. If the emulation is capable of being specified, then the program proceeds to step S73, where the emulation mode that has been specified is stored in EMODE secured in advance at a prescribed address location in the RAM 12. Accordingly, the emulation mode in which processing was performed previously (or the emulation mode of the initial state) will have been stored in EMODE in a case where specification of the emulation mode has ended in failure.

When the program proceeds to step S74, printing control processing is executed in the emulation mode that has been designated by EMODE prevailing at this time.

If an error has occurred during the course of processing, the program proceeds to step S78. If there is no error, the program proceeds to step S76.

When the program proceeds to step S76, it is determined whether printing processing has ended, i.e., whether there is data not yet transmitted from the host computer. If it is judged that printing processing has not ended, the program proceeds to step S77, at which the next item of printing data is stored in the input buffer, after which the program returns to step S74.

If an error occurs during execution of emulation processing, on the other hand, the program proceeds to step S78, at which the data in EMODE at this time and information specifying the type of error are sent back to the host computer that transmitted the printing data.

As a result of the foregoing, in accordance with the fifth embodiment, processing is executed in an emulation mode that is in accordance with a prescribed order of priority in a case where an emulation mode to be started could not be specified with regard to entered printing control data. If an error has occurred during processing in an emulation mode in which processing is to be executed, the emulation mode in which processing is being executed and the contents of the error are sent back to the host computer. Accordingly, on the host computer side, measures for selecting a correct printing control program or correction of a control code can be performed rapidly so that it is possible to obtain correct printing.

Sixth Embodiment

Figure 13:
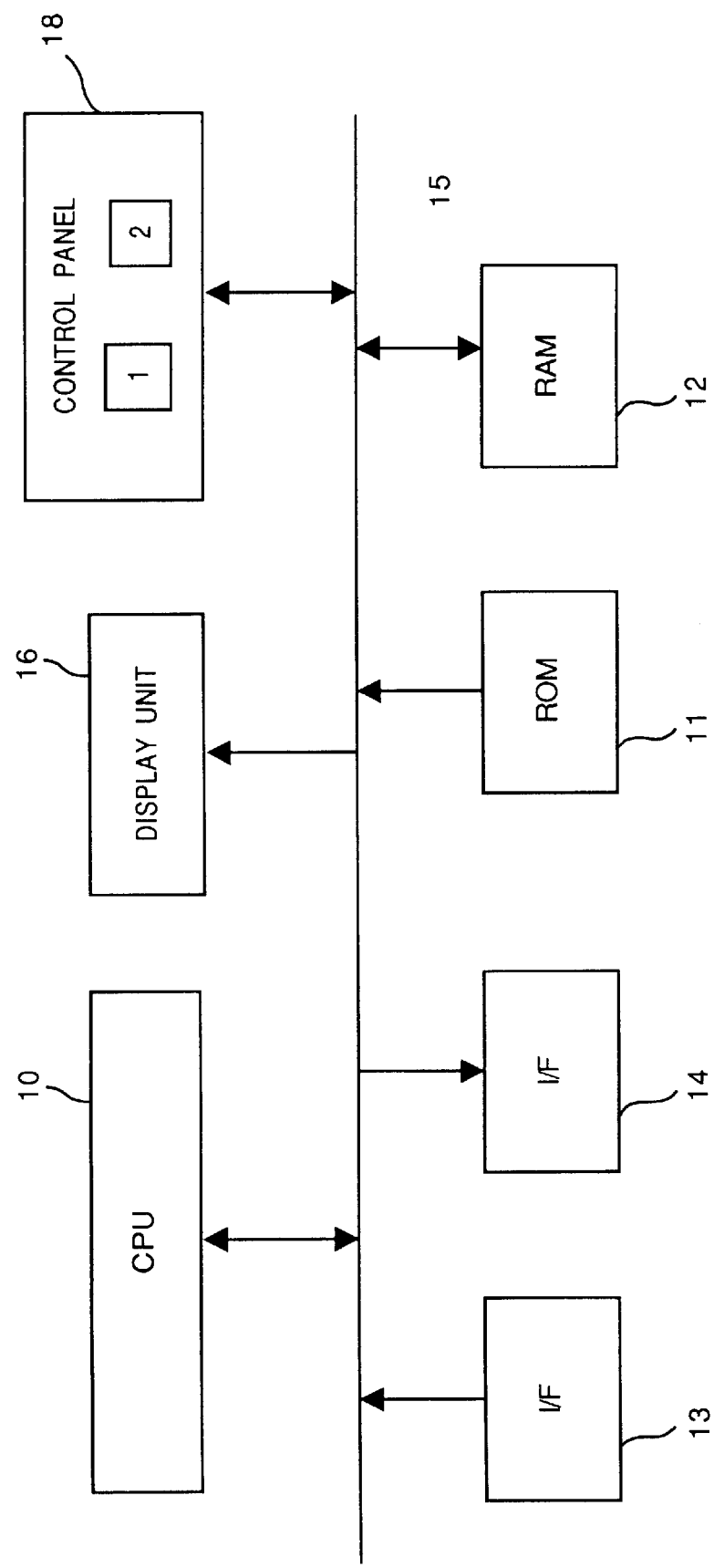
FIG. 13 is a block diagram illustrating a printing control apparatus according to a sixth embodiment of the present invention.

A sixth embodiment of the invention will now be described. The construction of the printing control apparatus 4 in the sixth embodiment is as illustrated in FIG. 13. Here a control panel 18 is not provided with the "STOP" key shown on the panel in FIG. 8.

Figure 14:
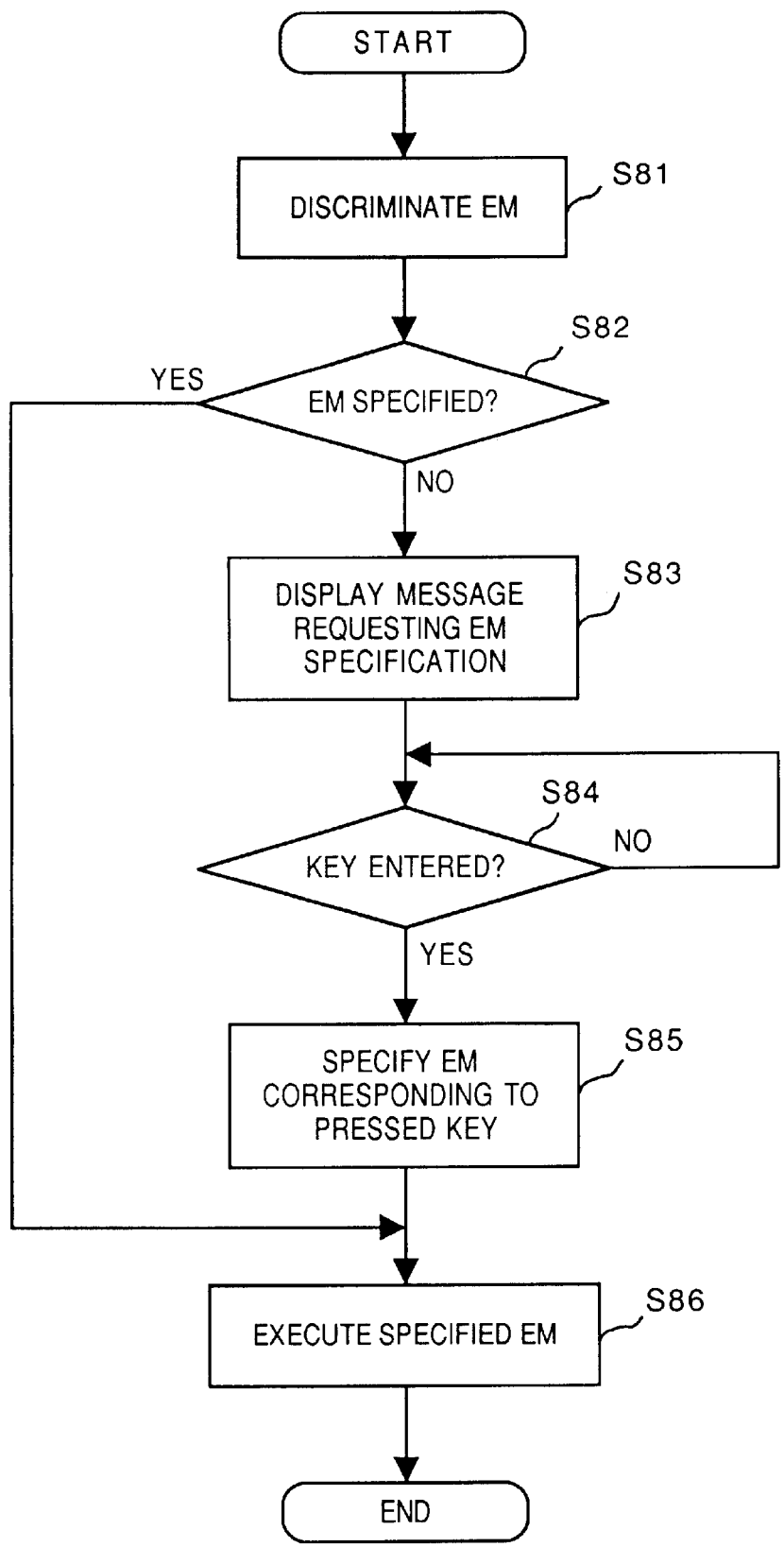
FIG. 14 is a flowchart illustrating the details of operation according to the sixth embodiment.

Operation will be described in accordance with the flowchart of FIG. 14.

The data in the reception buffer within the RAM 12 is investigated, the printer language of the printing data is determined and the corresponding emulation mode is specified at step S81. It is then determined at step S82 whether specification processing has been performed normally. If specification could be achieved, then steps S83, S84, S85 are skipped and the program proceeds to step S86, at which processing based upon the specified emulation mode is executed.

If specification could not be achieved, then the program proceeds to step S83, at which a message calling for selection of the emulation mode is displayed on the display unit 16 to so inform the operator. This is followed by step S84, at which the system waits for pressing of key "1" or "2" on the control panel 18 in order to select the emulation mode.

As a result of the foregoing, in accordance with the sixth embodiment, processing is executed in an emulation mode that is in accordance with a prescribed order of priority in a case where an emulation mode to be started could not be specified with regard to entered printing control data. At such time the operator selects the emulation if the emulation mode to be processed could not be specified. This makes it possible to obtain correct printing at all times.

Seventh Embodiment

A seventh embodiment of the invention will now be described. The construction of the printing control apparatus 4 in the seventh embodiment is the same as in the first embodiment.

Figure 15:
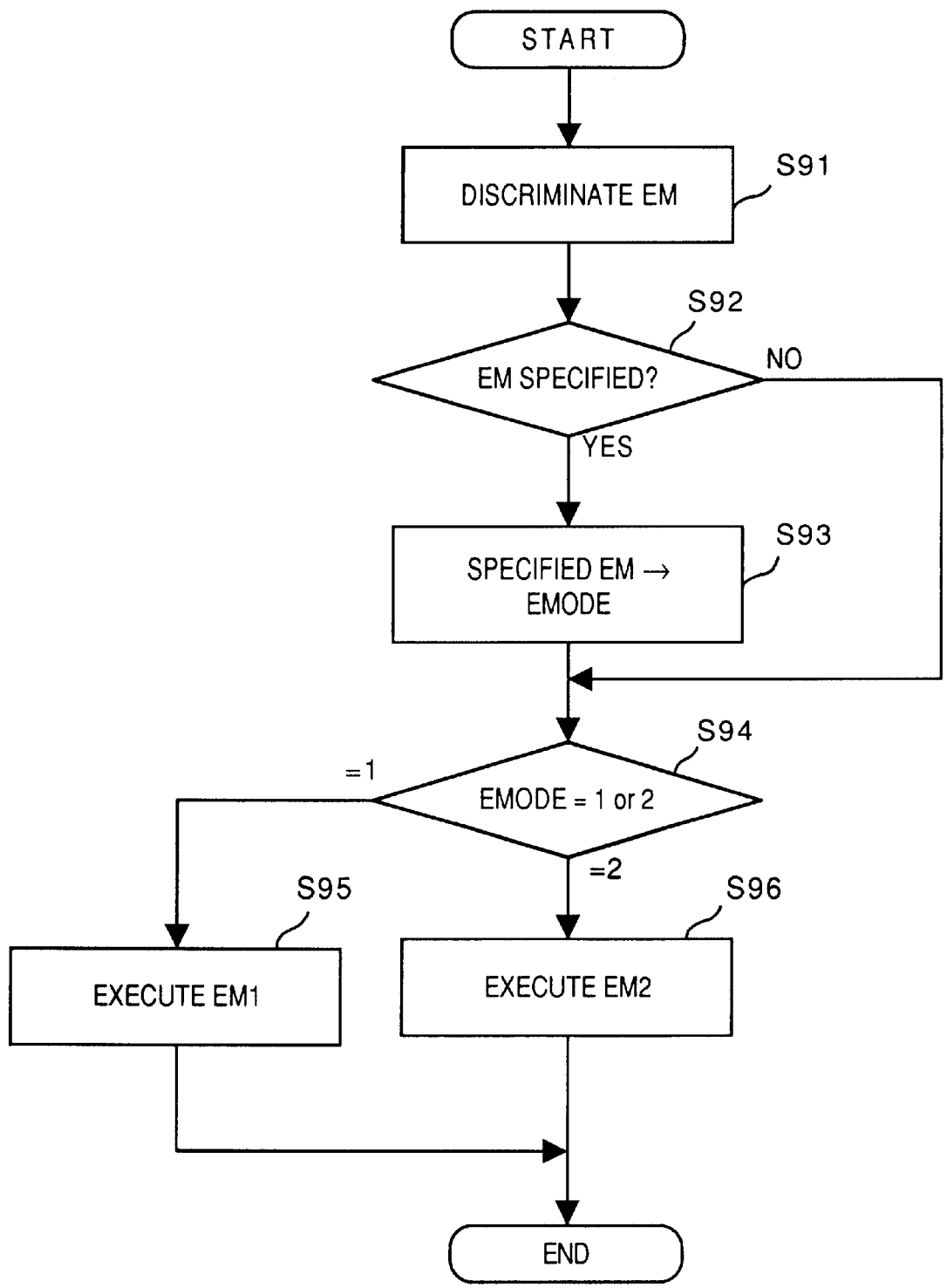
FIG. 15 is a flowchart illustrating the details of operation according to a seventh embodiment.

Operation will be described in accordance with FIG. 15.

The data in the reception buffer within the RAM 12 is investigated, the printer language of the printing data is determined and the corresponding emulation mode is specified at step S91. It is then determined at step S92 whether specification processing has been performed normally. If specification could be achieved, then the program proceeds to step S93, at which the specified emulation mode is stored in EMODE.

If specification could not be achieved, the processing of step S93 is skipped. Accordingly, the EMODE of the previous job is held or the emulation mode of the initial state is held in EMODE in this case.

When the program proceeds to step S94, the content of EMODE at this time is investigated and it is determined whether the content is emulation mode 1 or emulation mode 2.

The program then proceeds to step S95 or S96, at which emulation mode processing corresponding to the content of EMODE is executed.

As a result of the foregoing, in accordance with the seventh embodiment, processing is executed in an emulation mode that is in accordance with a prescribed order of priority in a case where an emulation mode to be started could not be specified with regard to entered printing control data. At such time the emulation mode in which the previous processing was performed is selected if the emulation mode to be processed could not be specified. This makes it possible to obtain correct printing at all times. As a result, emulation having a high rate of selection conformity is executed.

Eighth Embodiment

Figure 16:
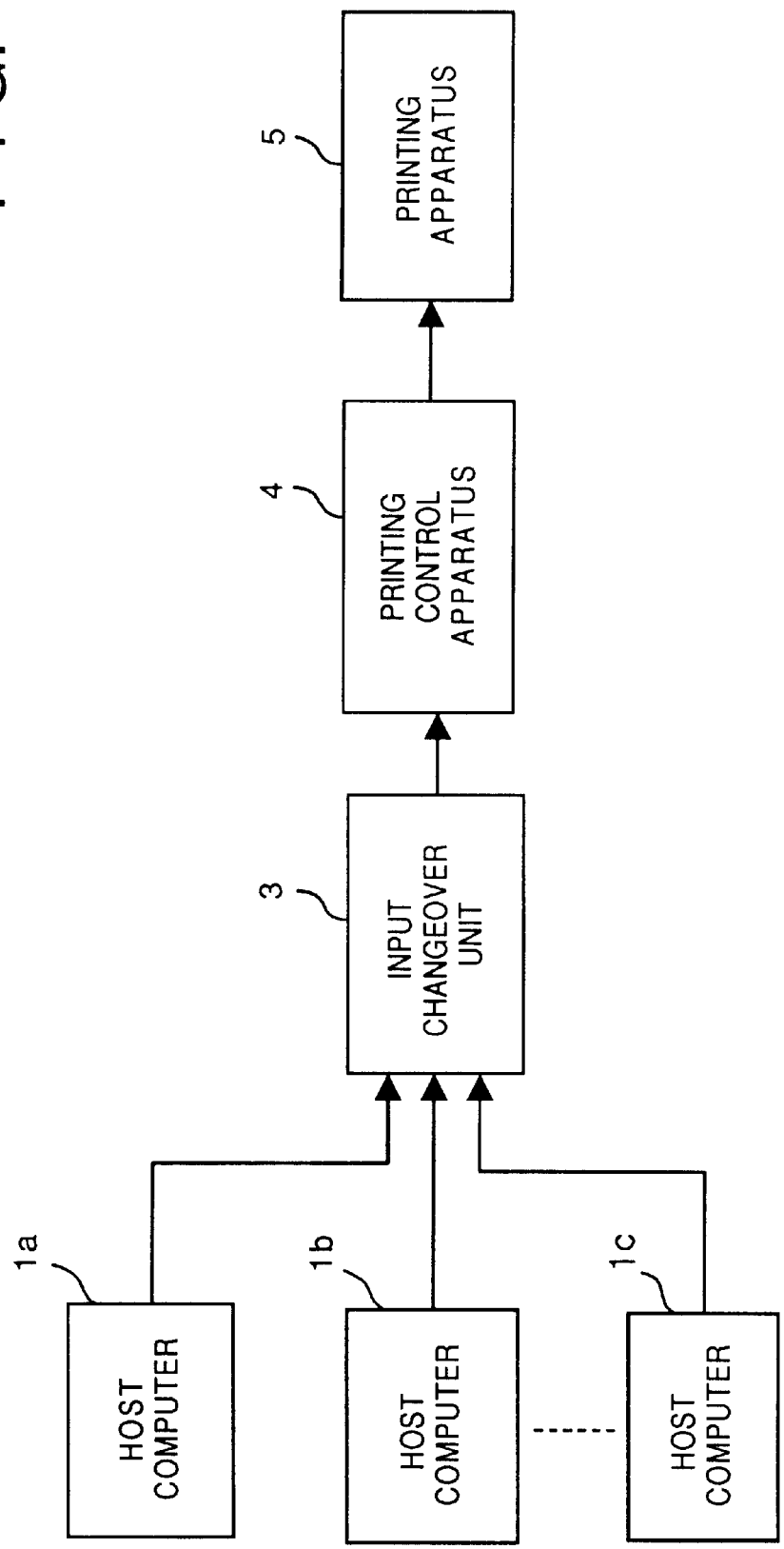
FIG. 16 is a block diagram illustrating a system according to an eighth embodiment of the present invention.

An eighth embodiment of the invention will be described next. The construction of the system in the eighth embodiment is especially suited to a case in which a number of host computers are connected, as indicated in FIG. 16.

M-number of host computers are connected to the printing control apparatus 4 in this embodiment. Further, information representing the total number of host computers and a breakdown of the types of printer languages that will be sent from these host computers is set in the RAM 12. The information indicates that P-number of host computers will output printing data for emulation 1, and that Q-number (Q=M−P) of host computers will output printing data for emulation 2, though this information is not shown in the drawings. As for the method of setting the information, a switch (not shown) may be used or the host computer may be so adapted as to transmit special control information for setting this information. Furthermore, the number of times each emulation mode is executed may be counted.

Figure 17:
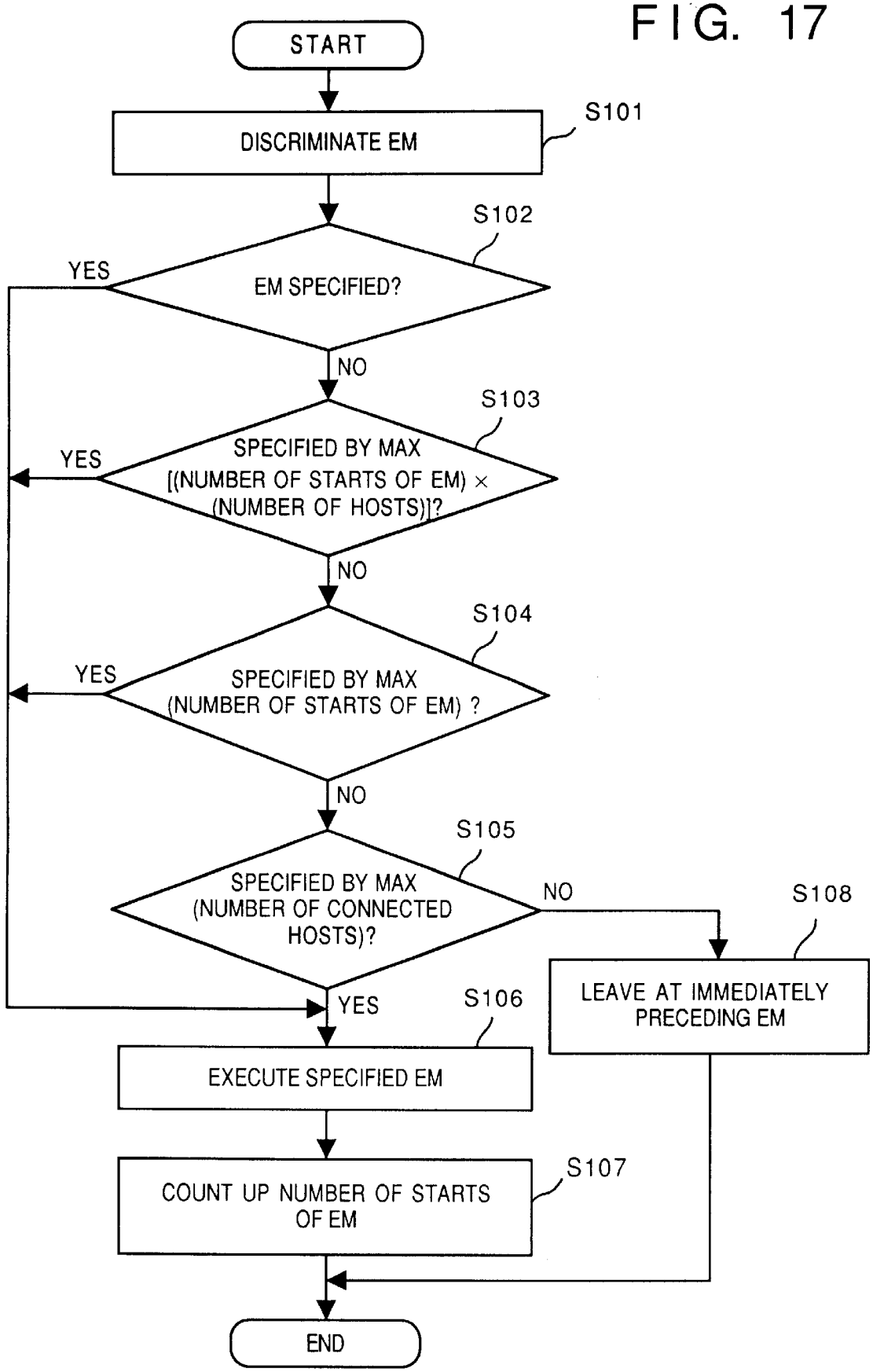
FIG. 17 is a flowchart illustrating the details of operation according to the eighth embodiment.

The processing executed by the printing control apparatus 4 according to the eighth embodiment will be described in accordance with the flowchart shown in FIG. 17.

The data in the reception buffer within the RAM 12 is investigated, the printer language of the printing data is determined and the corresponding emulation mode is specified at step S101. It is then determined at step S102 whether the emulation mode to be started could be specified.

If the corresponding emulation mode could be specified, the processing of steps S103, 104, 105 is skipped and the program proceeds to step S106, where processing is executed in the specified emulation mode. If processing corresponding to a series of printing data has ended, the program proceeds to step S107, at which the number of times the emulation mode has started is counted up.

If the emulation mode to be started could not be specified solely from the received data, the program proceeds to step S103, where the number of times each emulation started is multiplied by the number of host computers and the emulation mode for which the largest numerical value has been obtained is specified as the emulation mode to be started.

For the sake of simplicity, assume for example that ten host computers are connected, of which eight output printing data for emulation mode 1 and the remaining two output printing data for emulation mode 2.

In terms of probability, it is highly likely that the printing data will be that for emulation mode 1. In this embodiment, however, judgment cannot be made based solely on this information and therefore the number of times each emulation mode started is multiplied.

On the basis of the above-mentioned condition, assume that execution in the emulation mode 1 has been performed five times in the past and that execution in the emulation mode 2 has been performed 50 times in the past.

In this case, when the product (=8×5) of the number of host computers for the emulation mode 1 and the number of starts of the emulation mode 1 is compared with the product (=2×50) of the number of host computers for the emulation mode 2 and the number of starts of the emulation mode 2, it is found that the numerical value of the latter is larger. Accordingly, in a case where this state is attained, the latter, namely the emulation mode 2, is selected. This is exactly the decision processing of step S103.

If the emulation mode cannot be specified even at the decision processing of step S103, the program proceeds to step S104, where emulation is carried out according to the emulation mode having the larger number of past starts.

A case can be hypothesized in which the numbers of starts of the emulations are the same. In this case, therefore, the emulation mode is specified at step S105 to be that of the larger number of connected host computers. In this case, however, the emulation mode is not counted up. The reason for this is the same as that mentioned in the first embodiment.

If the emulation mode cannot be specified even at step S105, the program proceeds to step S108, at which the emulation mode started last is adopted.

In accordance with the eighth embodiment, as described above, even if the corresponding emulation mode cannot be specified based solely upon the printing data, the emulation mode in which processing is to be executed is discriminated based upon the number of times each emulation has been selected and the number of host computers that will output printing data for each emulation mode. As a result, it is possible to execute printing processing at a high rate of conformity.

In the first through eighth embodiments described above, two emulation modes are used. However, it goes without saying that more than two emulation modes may be employed. Further, though the printing control apparatus 4 is described as being an independent apparatus in the foregoing embodiments, it may incorporate the input changeover unit 3. In addition, an arrangement may be adopted in which both the input changeover unit 3 and printing control apparatus 4 are incorporated in the printing apparatus or only the printing control apparatus 4 is incorporated in the printing control apparatus 4.

Further, the printing control apparatus 4 has only one input interface in the foregoing embodiments. However, it goes without saying that two or more input interfaces may be provided or that the interface may be for connected to a LAN.

It should be noted that a laser-beam printer is assumed to be the printing apparatus 5, though this has not been particularly described in the foregoing embodiments.

The construction of a laser-beam printer to which the embodiments are applied will be described with reference to FIG. 18.

Figure 18:
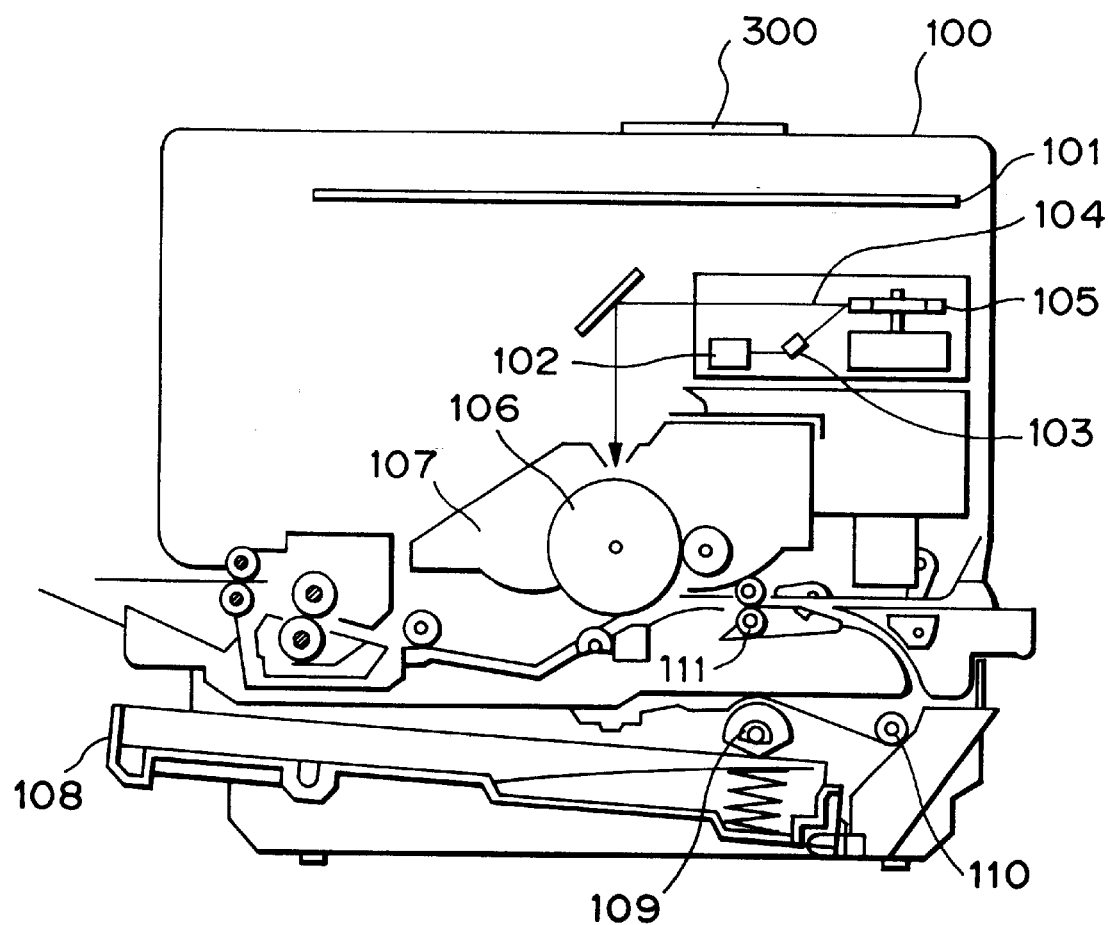
FIG. 18 is a diagram showing the structure of a laser-beam printer serving as a printing apparatus according to this embodiment.

FIG. 18 is a sectional view showing the internal structure of a laser-beam printer (hereinafter abbreviated to "LBP") serving as the printing apparatus 5 according to this embodiment. The LBP registers character patterns represented by commands sent via the printing control apparatus in this embodiment, registers standard forms (form data), etc.

In FIG. 18, numeral 100 denotes the main body of the LBP. Printing information (character codes, etc.), form information or macro instructions supplied by an externally connected host computer or the printing control apparatus 4 of the embodiment are applied to the LBP 100, which proceeds to store this information, create character patterns or form patterns in accordance with this information and form the corresponding images on a recording paper serving as a recording medium. Numeral 300 denotes a control panel on which operating switches and LED indicators are arranged, and numeral 101 designates a printer control unit for performing overall control of the LBP 100 and analyzing character information supplied by a host computer. The printer control unit 101 mainly converts the character information into a video signal of the corresponding character patterns and outputs the video signal to a laser driver 102.

The laser driver 102 is a circuit for driving a semiconductor laser 103. Laser light 104 is emitted by the semiconductor laser 103 in conformity with the applied video signal. The laser light 104, which is switched on and off, is deflected to the left and right by a rotating polygonal mirror 105 so as to scan and expose an electrostatic drum 106. As a result, an electrostatic latent image of a character pattern is formed on the drum 106. The latent image is developed by a developing unit 107 surrounding the electrostatic drum 10, after which the latent image is transferred to recording paper. The recording paper is used in the form of cut sheets accommodated in a paper cassette 108 loaded in the LBP 100. The paper is fed into the apparatus by a paper-feed roller 109 and conveyor rollers 110, 111 so as to be supplied to the electrostatic drum 106. Toner that becomes attached to the drum by the foregoing processing is transferred to the recording paper by a transfer device, after which the recording paper is ejected from the apparatus via a fixing device.

The printing apparatus 5 is not limited to a laser-beam printer. An ink-jet printer of the kind described below can also be employed as the printing apparatus 5.

Figure 19:
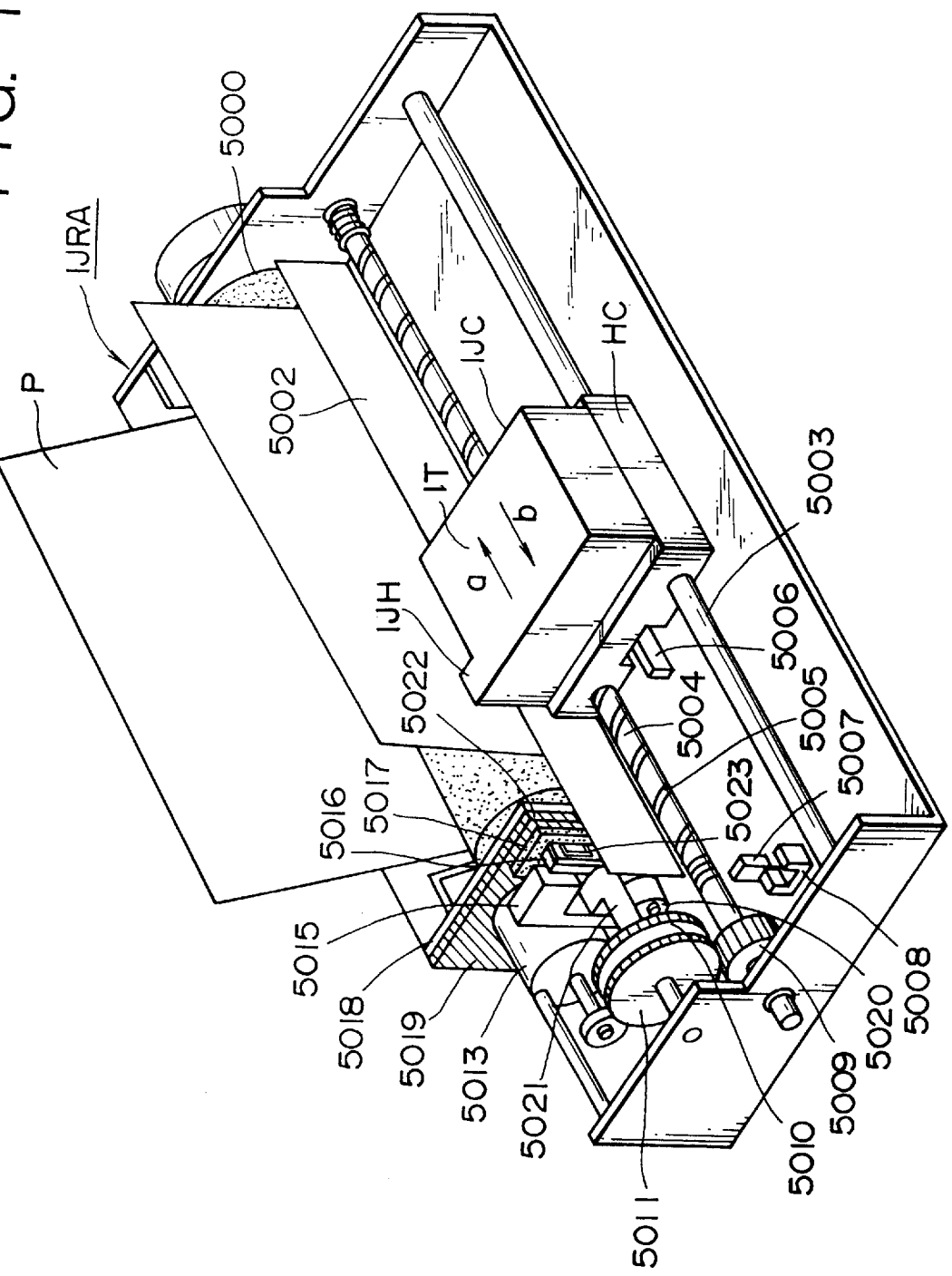
FIG. 19 is a diagram showing the structure of an ink-jet printer serving as a printing apparatus according to this embodiment.

FIG. 19 is a perspective view showing the general appearance of an ink-jet recording apparatus IJRA to which the present invention can be applied. As shown in FIG. 19, the apparatus includes a carriage HC engaged with the spiral threads 5005 of a lead screw 5004 rotated via driving-force transmission gears 5011, 5009 in operative association with the reversible rotation of a drive motor 5013. The carriage HC has a pin (not shown) moved back and forth in the directions of arrows a, b along a guide 5003. An ink-jet cartridge IJC is mounted on the carriage HC. Numeral 5002 denotes a paper urging plate for urging the paper against a platen 5000 over the traveling direction of the carriage. Numerals 5007, 5008 denote photocouplers serving as home-position sensing means for changing over the rotating direction of the motor 13 upon confirming that a lever 5006 on the carriage is located in the vicinity of the photocouplers. Numeral 5016 designates a member supporting a cap member 5022 for capping the front side of a recording head, and numeral 5015 represents suction means for attracting the cap. The suction means 5015 attracts and restores the recording head via an opening 5023 in the cap. Numeral 5017 denotes a cleaning blade and 5019 a member capable of moving the blade 5017 back and forth. The member 5019 is supported on a support plate 5018. It goes without saying that the blade is not limited to one of this type and that any well-known cleaning blade is applicable to this example. Numeral 5021 denotes a lever for starting the suction for recovery. The lever 5021 moves with movement of a cam 5020 engaged with the carriage, and driving force from the drive motor is controlled by well-known transmission means such as a clutch changeover means.

As for these capping, cleaning and suction recovery operations, the arrangement is such that when the carriage arrives in an area on the side of the home position, the desired processing is executed at the corresponding positions by the action of the lead screw 5004. However, if an arrangement is adopted in which the desired operations are performed at a well-known timing, this arrangement also can be applied to this example.

Thus, it is obvious that the present invention is not limited to a laser-beam printer and can be applied also to an ink-jet printer. Furthermore, it goes without saying that other types of printers also can be applied.

Ninth Embodiment

In the foregoing embodiments, an example is described in which the input changeover unit 3, printing control apparatus 4 and printing apparatus 5 are independent. However, an arrangement in which these are made to accommodate a single printing apparatus is as shown in FIG. 20.

Figure 20:
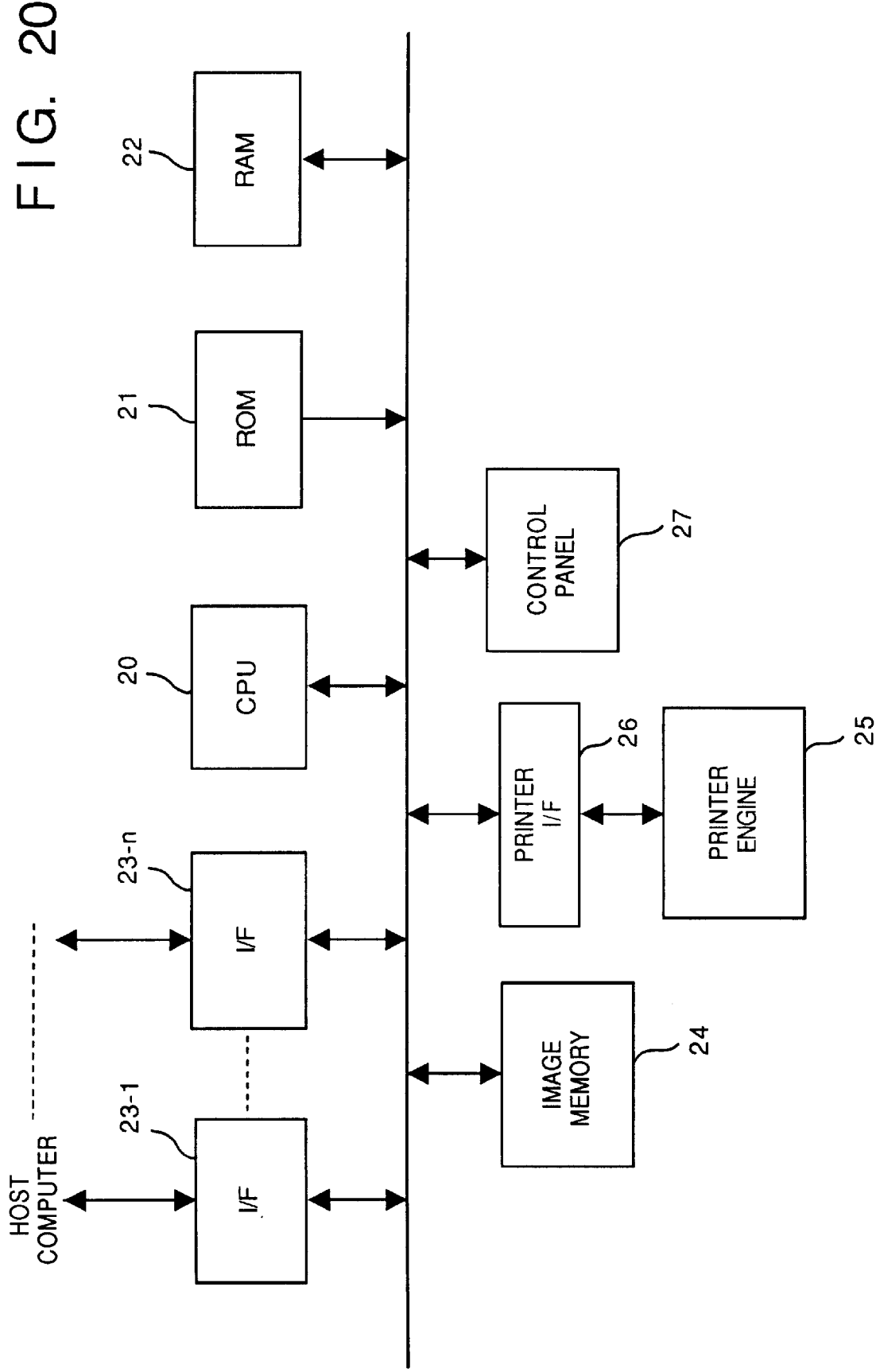
FIG. 20 is a block diagram showing an apparatus according to a ninth embodiment of the present invention.

In FIG. 20, numeral 20 denotes a CPU for supervising overall control of the apparatus, 21 a ROM storing font data as well as an emulation-mode changeover program and printing processing program of the first through eighth embodiments, and 22 a RAM used as a work area of the CPU 20 and having the input buffer IB, the temporary storage member TM and other flag areas used in the foregoing embodiments. Of course, if the processing performed is similar to that of the first embodiment, areas for holding the values of counts corresponding to the counters EC1, EC2 and WC also are provided in the RAM 22. Numerals 23-1 through 23-n denote interface I/Fs for receiving printing data from host computers. Numeral 24 denotes an image memory for developing a bitmap image to be printed, 25 a printer engine which actually performs the printing processing shown in FIG. 18 or 19, 26 a printer interface for transferring the bitmap image data in the image memory 24 to the printer engine 25, and 27 a control panel having switches for applying various instructions and an LCD display unit for displaying messages. The control panel 27 corresponds to the display unit 5 of FIG. 5, the control panel 17 of FIG. 18 or the control panel 18 of FIG. 13.

This embodiment differs from the first through eighth embodiments in that the CPU 20 executes all of the processing performed by the input changeover unit 3, printing control apparatus 4 and printing apparatus 5 in FIG. 1, and in that whereas the printing control apparatus 4 effects a conversion into printing data capable of being interpreted by the printing apparatus 5 in the earlier embodiments, in this embodiment a bitmap image is generated directly and developed in the image memory 24.

While executing the processing of the input changeover unit 3 and the processing of any of the output control units 4 that are described in the first through eighth embodiments, it will suffice for the CPU 20 in this arrangement to perform processing for outputting the data of the bitmap image to the printer engine 25 via the printer I/F 26 when one page of the bitmap image has been developed. However, in a case where the printer engine 25 is of the type in which a recording head is scanned, as shown in FIG. 19, it will suffice to perform printing whenever data is developed into a bitmap image of an image recorded by a single scan.

It will be understood that output destination of the printing control apparatus 4 in these embodiments need not necessarily be a printer. In other words, a display unit for displaying images may be the destination of the output. Accordingly, the present invention is not limited by the type of printing control apparatus.

In accordance with the present invention, as described above, even if one process or means in which control processing is to be executed cannot be specified based on received data, this can be analogized from the processing environment up to the moment.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus having a plurality of emulation modes, comprising:

memory means for storing inputted data from an external apparatus;

processing means for processing a predetermined unit of inputted data by using one emulation mode;

interruption means for interrupting the processing using one emulation mode of the predetermined unit of inputted data; and controlling means for, when said interruption means interrupts the processing of said processing means, performing the processing using another emulation mode from the beginning of the predetermined unit of inputted data stored in said memory means if data, on which the processing by using the one emulation mode has been performed, remains in said memory means, and for requesting to send the predetermined unit of inputted data if the data does not remain in said memory means.

2. The apparatus according to claim 1, wherein said interruption means interrupts the processing of said processing means for the predetermined unit of inputted data in response to a predetermined operation by a user.

3. The apparatus according to claim 1, further comprising detection means for detecting an error in the inputted data while said processing means is processing the inputted data by using an emulation mode, wherein said interruption means interrupts the processing of said processing means in response to error detection of said detection means.

4. The apparatus according to claim 1, further comprising:
   determination means for determining an emulation mode to be used by said processing means from the plurality of emulation modes based upon the inputted data in predetermined units; and
   selection means for selecting an emulation mode to be used for processing the inputted data in the predetermined units, wherein said selection means selects the emulation mode determined by said determination means if said determination means determines an emulation mode, and, if said determination means cannot determine an emulation mode, said selection means selects an emulation mode specified based on history of past emulation modes determined by said determination means, a previously used emulation mode, or a predetermined emulation mode.

5. The apparatus according to claim 4, further comprising:
   detection means for detecting an error in the inputted data while said processing means is processing the inputted data by using one of a plurality of emulation modes, wherein said interruption means interrupts the processing of said processing means for the predetermined unit of inputted data in response to detection of said detection means, and said determination means determines another emulation mode to be processed for the predetermined unit of inputted data.

6. The apparatus according to claim 1, wherein the inputted data is described in a printer language and the emulation mode corresponds to a kind of printer language.

7. The apparatus according to claim 1, wherein said processing means includes means for generating bit-map image data based on the inputted data.

8. The apparatus according to claim 7, further comprising print means for printing an image based on the generated bit-map image data.

9. An image processing method of controlling an apparatus having a plurality of emulation modes, comprising:
   an inputting and storing step of inputting data in predetermined units from an external apparatus and of storing the inputted data into a predetermined memory;
   a processing step of processing a predetermined unit of inputted data by using one emulation mode;
   a determining step of determining whether or not the processing for the predetermined unit of inputted data is interrupted;
   an interrupting step of interrupting the processing using the one emulation mode of the predetermined unit of inputted data in accordance with the determination in said determining step; and
   a control step of, when the processing in said processing step is interrupted, performing the processing using another emulation mode from the beginning of the predetermined unit of inputted data stored in the predetermined memory if data, on which the processing by using the one emulation mode has been performed, remains in the predetermined memory, and requesting to send the predetermined unit of inputted data if the data does not remain in the predetermined memory.

10. The method according to claim 9, wherein in said interrupting step, the processing for the predetermined unit of inputted data is interrupted in response to a predetermined operation by a user.

11. The method according to claim 9, further comprising a detecting step of detecting an error in the inputted data while said processing step is processing the inputted data by using an emulation mode, wherein in said interrupting step, the processing is interrupted in response to error detection in said detection step.

12. The method according to claim 9, further comprising:
   a determining step of determining an emulation mode to be used in said processing step from the plurality of emulation modes based upon the inputted data in the predetermined units; and
   a selecting step of selecting an emulation mode to be used for processing the predetermined unit of inputted data, wherein in said selecting step, an emulation mode determined in said determining step is selected if said determination step determines an emulation mode, and, if said determining step cannot determine an emulation mode, an emulation mode specified based on history of past emulation modes determined in said determining step, a previously used emulation mode, or a predetermined emulation mode is selected.

13. The method according to claim 12, further comprising:
   a detecting step of detecting an error in the inputted data while said processing step is processing the inputted data by using one of the plurality of emulation modes, wherein in said interrupting step, the processing for the predetermined unit of inputted data is interrupted in response to detection in said detecting step, and another emulation mode to be processed for the predetermined unit of inputted data is determined.

14. The method according to claim 9, wherein the inputted data is described in a printer language and the emulation mode corresponds to a kind of printer language.

15. The method according to claim 9, wherein said processing step includes a step of generating bit-map image data based on the inputted data.

16. The method according to claim 15, further comprising a printing step of printing an image based on the generated bit-map image data.

* * * * *

UNITED STATES PATENT AND TRADEMARK OFFICE
CERTIFICATE OF CORRECTION

PATENT NO. : 5,913,016
DATED : June 15, 1999
INVENTOR(S) : SHIGERU MATSUYAMA, ET AL.

It is certified that error appears in the above-identified patent and that said Letters Patent is hereby corrected as shown below:

COLUMN 5,
Line 42, "3 5," should read --3~5,--.

COLUMN 6,
Line 47, "EC1>EC2" should read --EC1≥EC2--.

COLUMN 11,
Line 3, "emulation," should read --emulation--.

Signed and Sealed this

Seventh Day of December, 1999

Attest:

Q. TODD DICKINSON

Attesting Officer          Acting Commissioner of Patents and Trademarks